(12) United States Patent
Kakuda et al.

(10) Patent No.: US 8,636,417 B2
(45) Date of Patent: Jan. 28, 2014

(54) WHEEL SUPPORT STRUCTURE FOR MOTORCYCLE

(75) Inventors: Kouichi Kakuda, Kanagawa (JP); Hirokazu Yajima, Kanagawa (JP); Aya Kikuchi, Kanagawa (JP); Takashi Fujioka, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/391,957

(22) PCT Filed: Jun. 30, 2011

(86) PCT No.: PCT/JP2011/065052
§ 371 (c)(1),
(2), (4) Date: Apr. 25, 2012

(87) PCT Pub. No.: WO2012/014622
PCT Pub. Date: Feb. 2, 2012

(65) Prior Publication Data
US 2012/0200145 A1    Aug. 9, 2012

(30) Foreign Application Priority Data

| Jul. 28, 2010 | (JP) | 2010-168929 |
| Nov. 30, 2010 | (JP) | 2010-265854 |
| Dec. 22, 2010 | (JP) | 2010-285436 |
| Jan. 26, 2011 | (JP) | 2011-014007 |
| Feb. 17, 2011 | (JP) | 2011-031849 |
| Feb. 17, 2011 | (JP) | 2011-032002 |

(51) Int. Cl.
*F16C 41/00*    (2006.01)

(52) U.S. Cl.
USPC .................................................. 384/448

(58) Field of Classification Search
USPC ......... 384/448, 477, 478, 484–486, 489, 537, 384/538, 584, 585, 617; 301/105.1, 109, 301/110
See application file for complete search history.

(56) References Cited

U.S. PATENT DOCUMENTS 5,785,433 A    7/1998   Takahashi et al.
6,280,095 B1 *  8/2001   Furukoshi et al. ............ 384/489
(Continued)

FOREIGN PATENT DOCUMENTS

DE    197 30 749    1/1998
GB    2 315 524     2/1998
(Continued)

OTHER PUBLICATIONS

International Search Report dated Sep. 13, 2011, from corresponding International Application No. PCT/JP2011/065052.

*Primary Examiner* — Phillip A Johnson
(74) *Attorney, Agent, or Firm* — Katten Muchin Rosenman LLP

(57) ABSTRACT

In a wheel support structure for a motorcycle, a magnetic encoder 34 for detecting rotational speed is mounted and fastened to the inner circumferential surface of a cylindrical section 36a, which extends outward in the axial direction from the outer ring 22, of an encoder installation plate 35a that is attached to the end section in the axial direction of the outer ring 22 of the one of the rolling bearings 21a on the side toward the other rolling bearing 4, or is mounted and attached to the side surface toward the side of the other rolling bearing 4 of a slinger 73, which is attached to the end section in the axial direction of the outer ring 22b of the one of the rolling bearings 21a on the side toward the other rolling bearing 4 such that the end surface on the inner diameter side closely faces the outer surface of the inner ring 24 to form labyrinth space 42. Preferably, a rotation restraining member 86 is fastened to the outer circumferential surface of the outer ring 82a, which is the rotating ring, and there is engagement between this rotation restraining member 86 and the inner circumferential surface of the hub 6, which is the rotating member.

9 Claims, 38 Drawing Sheets

(56) References Cited

U.S. PATENT DOCUMENTS

| | | | |
|---|---|---|---|
| 6,655,844 B1 * | 12/2003 | Message et al. | 384/448 |
| 7,307,414 B2 * | 12/2007 | Ito | 324/174 |
| 7,771,121 B2 * | 8/2010 | Koike et al. | 384/448 |

FOREIGN PATENT DOCUMENTS

| | | |
|---|---|---|
| JP | 9-314695 | 12/1997 |
| JP | 10-82428 | 3/1998 |
| JP | 2000-179562 | 6/2000 |
| JP | 2001-27255 | 1/2001 |
| JP | 2003-287043 | 10/2003 |
| JP | 2005-33999 | 2/2005 |
| JP | 2005-331430 | 12/2005 |
| JP | 2006-105341 | 4/2006 |
| JP | 2007-139075 | 6/2007 |
| JP | 2007-211840 | 8/2007 |
| JP | 2007-285514 | 11/2007 |
| JP | 2007-315585 | 12/2007 |
| JP | 2007-321894 | 12/2007 |
| JP | 2008-275365 | 11/2008 |
| JP | 2009-229157 | 10/2009 |

* cited by examiner

WHEEL SUPPORT STRUCTURE FOR MOTORCYCLE

BACKGROUND OF THE INVENTION

1. Field of the Invention

The present invention relates to a wheel support structure of a motorcycle (two-wheeled motor vehicle) such as a standard motorcycle, scooter and the like, and more particularly to a wheel support structure for a motorcycle having a wheel rotational speed detection apparatus.

2. Description of the Related Art

Anti-lock brake systems (ABS) are widely used as a device for stabilizing the traveling state of an automobile. Use of such an ABS has mainly been centered on four-wheeled motor vehicles, however, in recent years, such systems have begun to be used in two-wheeled motor vehicles as well. As is well known, in order for ABS control it is necessary to find the rotational speed of the wheels, so conventionally installing a rotational speed detection device in a wheel-supporting ball bearing unit for allowing a wheel to be supported by the suspension such that the wheel rotates freely is widely performed.

However, construction of a rotational speed detection apparatus for a four-wheeled motor vehicle cannot be used as is in an apparatus for a two-wheeled motor vehicle. The main two reasons for this are that (1) a wheel-supporting ball bearing for a two-wheeled motor vehicle is rather compact when compared with a wheel-supporting ball bearing for a four-wheeled motor vehicle, and (2) whereas many wheel-supporting ball bearings for four-wheeled motor vehicles are inner ring rotating type, many of the wheel-supporting ball bearings for two-wheeled motor vehicles are outer ring rotating type, and for that reason the construction of a rotational speed detection device for a four-wheeled motor vehicle cannot be applied as for use in a two-wheeled motor vehicle.

FIG. 35 illustrates an example of construction for supporting a wheel of a motorcycle, and illustrates the construction of the portion that supports the wheel of a relatively compact motorcycle such as a scooter or the like such that the wheel can rotate freely. This wheel support apparatus 1 for a motorcycle comprises a pair of single-row ball bearings 4, a support shaft 3 that is fits inside the inner rings of these ball bearings 4, with both end sections thereof fastened to the vehicle body by way of a pair of forks 2, and a hub 6 that supports the tire by way of a wheel 7 such that the tire can rotate freely. In this construction, inner ring spacers 5a, 5c are mounted between the inner rings of the ball bearings and the forks 2, and an inner ring spacer 5b is mounted between the inner rings of the ball bearings 4, so that even when the support shaft 3 is tightly fastened on both ends by a nut 8, there is no large axial load applied to these ball bearings 4.

On the other hand, a rotational speed detection apparatus that uses a rolling bearing with magnetic encoder such as disclosed in JP2007-321894(A), JP2006-105341(A), JP2007-139075(A), JP2007-211840(A), JP2007-285514(A) and JP2009-229157(A) has been conventionally known as a rotational speed detection apparatus to be installed for controlling the ABS of a motorcycle. FIG. 36 illustrates an example of a ball bearing with a magnetic encoder as disclosed in JP2007-3321894(A). This ball bearing 10 with magnetic encoder comprises: an outer ring 11, which is the rotating ring; an inner ring 12, which is the stationary ring; a plurality of balls 13, which are rolling bodies that are located between the outer ring 11 and the inner ring 10 such that they can roll freely; a retainer 14 that holds the balls 13 such that they are uniformly space and such that they can roll freely; a sealing plate 15 that is attached to one of the end sections in the axial direction of the outer ring 11 and comes in sliding contact with the inner ring 12; and a sealing plate 16 with a magnetic encoder that is attached to the other end in the axial direction of the outer ring 11 and that comes in sliding contact with the inner ring, the magnetic encoder 9 being mounted on and fastened to the outside in the axial direction of this sealing plate 16.

By installing this kind of ball bearing 10 with magnetic encoder in the place of one of the pair of single-row ball bearings 4 that are assembled in the construction illustrated in FIG. 35, and by detecting the rotational speed of the magnetic encoder 9 of the ball bearing 10 with magnetic encoder by way of a magnetic sensor 17, it is possible to detect the rotational speed of the wheel 7, or in other words, it is possible to detect the rotational speed of the wheel of the motorcycle. FIG. 37 illustrates an example of construction of a wheel support apparatus for a motorcycle comprising this kind of magnetic encoder. In this construction la, a magnetic sensor 17 is fastened to the non-rotating inner ring spacer 5a so that the magnetic detection surface thereof faces the detected surface of the magnetic encoder of the ball bearing with magnetic encoder. The output from the magnetic sensor 17 is transmitted to an external computing device (not illustrated in the figure) by way of a harness 19, and is appropriately used for brake control by the ABS apparatus. In addition to the example illustrated in FIG. 37, FIG. 38 illustrates construction of another example of a rotational speed detection apparatus wherein a ball bearing 10 with magnetic encoder and circular ring-shaped holder member 18 are arranged on the support shaft 3 and the magnetic encoder 9 closely faces the magnetic sensor 17 that is supported by the holder member 18.

As described above, this kind of wheel-supporting rolling bearing for a two-wheeled motor vehicle is more compact than a wheel-supporting rolling bearing for a four-wheeled motor vehicle, and the size of the magnetic encoder that can be used is limited. Therefore, the magnetic flux density per magnetic pole of a magnetic encoder for a two-wheeled motor vehicle is smaller than in a magnetic encoder for a four-wheeled motor vehicle, so in order to detect rotational speed with good precision in a rolling bearing with rotational speed detection apparatus for a motorcycle, there is a problem in that either the ease of assembly must be sacrificed in order to reduce the air gap space between the sensor and the magnetic encoder, or the resolution must be sacrificed in order to reduce the number of magnetic poles in the circumferential direction of the magnetic encoder. However, when the component elements of the rolling bearing elastically deform due to a moment that is applied during operation, the possibility that rubbing will occur between the detection part of the magnetic sensor and the detected surface of the encoder becomes high, so in that case reducing the air gap is not preferable. Moreover, when the number of magnetic poles is reduced, the number of times that rotational speed detection can be performed during one rotation of the wheel is reduced, so is disadvantageous from the aspect of maintaining speed of ABS control.

In the case of a rotational speed detection apparatus for the wheel of a two-wheeled motor vehicle, differing from an apparatus for a four-wheeled motor vehicle, the magnetic encoder 9 is supported by and fastened to the hub 6 by way of the outer ring 4 instead of being fastened directly. Therefore, when there is slippage in the fit between the hub 6 and the outer ring 4, and so-called creep occurs, there is a problem in that the rotational speeds of these members do not match, and reliability of the rotational speed detection of the wheel is lost. Construction for preventing the occurrence of this kind of creep such as that disclosed in JP10-82428(A), JP2001-27255(A), JP2005-33999(A), JP09-314695(A), JP2003-287043(A) and JP2007-315585(A) has been known, however, up until now, using construction for preventing the occurrence of this kind of creep in order to improve the reliability of the rotational speed detection in a motorcycle has not been investigated.

Furthermore, the sealing plate with magnetic encoder in this kind of rolling bearing with rotational speed detection apparatus comprises a metal core, seal lips and a magnetic encoder, however, because the both the seal lips and the magnetic encoder cannot be mounted and fastened to the metal core in a single process, processing becomes complex, and processing requires time. Such a problem makes it difficult to lower the costs of the wheel support apparatus for a motorcycle that uses this kind of rolling bearing with rotational speed detection apparatus.

RELATED LITERATURE

Patent Literature

Patent literature 1: JP2007-321894(A)
Patent literature 2: JP2006-105341(A)
Patent literature 3: JP2007-139075(A)
Patent literature 4: JP2007-211840(A)
Patent literature 5: JP2007-285514(A)
Patent literature 6: JP2009-229157(A)
Patent literature 7: JP10-82428(A)
Patent literature 8: JP2001-27255(A)
Patent literature 9: JP2005-33999(A)
Patent literature 10: JP09-314695(A)
Patent literature 11: JP2003-287043(A)
Patent literature 12: JP2007-315585(A)

SUMMARY OF THE INVENTION

Problems to be Solved by the Invention

In consideration of the problems above, an object of the present invention is to provide construction of a wheel support apparatus for a motorcycle comprising a rolling bearing with magnetic encoder that is capable of precisely performing rotational speed detection without sacrificing the ease of assembly.

Moreover, an object of the present invention is to provide construction of a wheel support apparatus for a motorcycle comprising a rolling bearing with magnetic encoder that is capable of improving the reliability of rotational speed detection by preventing the occurrence of creep, or in other words, the relative rotation between the outer ring, to which the encoder is mounted, and the hub.

Furthermore, an object of the present invention is to achieve construction of a wheel support apparatus for a motorcycle that can be manufactured with a reduced cost by providing a rolling bearing with magnetic encoder that can be manufactured by a simple process.

Means of Solving the Problems

The present invention relates to a wheel support structure for a motorcycle comprising: a pair of rolling bearings, each having an outer ring as a rotating ring, an inner ring as a stationary ring, and a plurality of balls that are located in the circumferential direction between this outer ring and inner ring such that the balls can roll freely; a support shaft, both ends thereof being connected to the vehicle body by way of forks; a hub that supports a tire by way of a wheel such that the tire can rotate; a magnetic encoder that is installed in one of the pair of rolling bearings, and that has a detected surface; and a magnetic sensor that is fastened to the support shaft or to a non-rotating member that is provided on the support shaft, and that has a detecting surface that faces the detected surface of the magnetic encoder.

Particularly, in the wheel support apparatus for a motorcycle of this first aspect of the present invention, the magnetic encoder is mounted and fastened to an inner circumferential surface of a cylindrical section, which extends outward in the axial direction from the outer ring, of an encoder installation plate that is attached to the end section in the axial direction of the outer ring of one of the rolling bearings on the other rolling bearing side, or is mounted and fastened to a side surface of a slinger on the other rolling bearing side, which is attached to the end section in the axial direction of the outer ring of the one rolling bearing on the other rolling bearing side such that the end surface on the inner diameter side closely faces the outer surface of the inner ring to form labyrinth space.

As long as the encoder installation plate has a cylindrical section that extends in the axial direction, various shapes can be employed. In the first embodiment, this encoder installation plate is a cylindrical shape that extends in the axial direction, with the end section in the axial direction of the cylindrical section being pressure fitted into the inner circumferential surface of the outer ring. In the second embodiment, this encoder installation plate comprises: a cylindrical section, the end section in the axial direction thereof being pressure fitted into the inner circumferential surface of the outer ring; and a circular disk section that is bent toward the inside in the radial direction from the inside end in the axial direction of the cylindrical section such that the end surface on the inner diameter side of the circular disk section closely faces the outer circumferential surface of the inner ring. In a third embodiment, this encoder installation plate comprises: a cylindrical section, the end section in the axial direction thereof being pressure fitted into the inner circumferential surface of the outer ring; a circular disk section that is bent toward the inside in the radial direction from the inside end in the axial direction of the cylindrical section; and seal lips that are provided around the inner perimeter section of the circular disk section such that the seal lips come in sliding contact with the inner ring.

In a fourth embodiment, this encoder installation plate comprises: a cylindrical section, the end section in the axial direction thereof being pressure fitted into the inner circumferential surface of the outer ring; and a bent section that is bent toward the inside in the radial direction from the outer end in the axial direction of the cylindrical section. In a fifth embodiment, this encoder installation plate comprises: a cylindrical section, the end section in the axial direction thereof being pressure fitted into the inner circumferential surface of the outer ring; a bent section that is bent toward the inside in the radial direction from the outer end in the axial direction of the cylindrical section; and a circular disk section that is bent toward the inside in the radial direction from the inside end in the axial direction of the cylindrical section such that the end surface on the inner diameter side of the circular disk section closely faces the outer circumferential surface of the inner ring. In a sixth embodiment, this encoder installation plate comprises: a cylindrical section, the end section in the axial direction thereof being pressure fitted into the inner circumferential surface of the outer ring; a bent section that is bent toward the inside in the radial direction from the outer end in the axial direction of the cylindrical section; a circular disk section that is bent toward the inside in the radial direction from the inside end in the axial direction of the cylindrical section; and seal lips that are provided around the inner perimeter section of the circular disk section such that the seal lips come in sliding contact with the inner ring.

In the first through sixth embodiments, a pressure fitting stepped section can be formed around the inner circumferential surface of the end section of the outer ring on the other rolling bearing side so as to have a larger diameter than this inner circumferential surface; and the encoder installation plate can be pressure fitted into this pressure fitting stepped section. In this case, the diameter of the cylindrical section is greater than the diameter of the inner circumferential surface of the outer ring, and is fitted into the inner circumferential surface of the pressure fitting stepped section. Moreover, in the aspect wherein there is no circular disk section provided on the inside end in the axial direction of the cylindrical section, a bent section can be provided that is bent from the inside end in the axial direction of the cylindrical section, and comes in contact with the side surface of the pressure fitting section. In the present invention, the inner circumferential surface of the outer ring is the portion of the circumferential surface on the inner diameter side of the outer ring that does not include the raceway surface but that is adjacent to the raceway surface, and corresponds to the surface on the most inner diameter side of the portion that does not include the raceway surface, except for a pressure fitting stepped section for the encoder installation plate, as well as a pressure fitting stepped section for installing the slinger, a seal fastening groove for installing a seal plate, a seal groove that comes in sliding contact with the seal lips of a seal plate, and shoulder sections adjacent to these grooves.

In a seventh embodiment, the encoder installation plate comprises: a cylindrical shaped pressure fitting section that is pressure fitted into the inner circumferential surface of the outer ring; a cylindrical section that has a diameter larger than the inner circumferential surface of the outer ring; and a circular disk section that connects this pressure fitting section with the cylindrical section. In an eighth embodiment, the encoder installation plate comprises: a pressure fitting section that is pressure fitted into the inner circumferential surface of the outer ring; a cylindrical section that has a diameter larger than the inner circumferential surface of the outer ring; a circular disk section that connects this pressure fitting section with the cylindrical section; and a circular disk section that is bent toward the inside in the radial direction from the inside end in the axial direction of the pressure fitting section such that the end surface on the inner diameter side of this circular disk section closely faces the outer circumferential surface of the inner ring. In a ninth embodiment, the encoder installation plate comprises: a pressure fitting section that is pressure fitted with the inner circumferential surface of the outer ring; a cylindrical section that has a diameter larger than the inner circumferential surface of the outer ring; a circular disk section that connects this pressure fitting section with the cylindrical section; a circular disk section that is bent toward the inside in the radial direction from the inside end in the axial direction of the pressure fitting section; and seal lips that are provided on the inner perimeter section of this circular disk section and that comes in sliding contact with the inner ring.

The second aspect of the present invention also relates to a wheel support structure for a motorcycle. In the wheel support structure for a motorcycle, many rolling bearings for wheel support are rotating outer ring type; however this aspect can also be applied to a rotating inner ring type. In other words, this second aspect of the present invention is a wheel support structure for a motorcycle comprising: a center axis member that is concentric with the wheel; an outer-diameter side member that surrounds the center axis member and is concentric with the center axis member; a rolling bearing that is located between the inner circumferential surface of the outer-diameter side member and the outer circumferential surface of the center axis member, and having an outer ring, an inner ring, and a plurality of balls that are located in the circumferential direction between this outer ring and inner ring such that the balls can roll freely; a magnetic encoder that is supported by and fastened to the end section of one of the circumferential surfaces of the outer ring and the inner ring which is a non-engaging surface being located on the opposite side from an engaging surface that engages with one of the center axis member and the outer-diameter side member which is a rotating member that rotates together with the wheel; and a magnetic sensor that is supported by and fastened to part of the other one of the center axis member and outer-diameter side member which is a stationary member that does not rotate, and that has a detecting section that faces the detected surface of the encoder.

Particularly, in all of the embodiments of the wheel support apparatus for a motorcycle of this second aspect of the present invention, a rotation restraining member is fastened to the surface on the engaging side of the rotating ring; and there is engagement between this rotation restraining member and the circumferential surface of the rotating member.

In a first embodiment of this second aspect of the present invention, an eccentric groove is formed on the circumferential surface of the engaging side, with the depth of the bottom surface of the eccentric groove gradually changing in the circumferential direction such that the center of the bottom surface is eccentric with respect to the center of the engaging surface; a rotation restraining member, which is a restraining ring having a non-complete circular ring shape with a convex section in the middle section in the circumferential direction that protrudes out in the radial direction, fits in the eccentric groove; the convex section of the restraining ring engages with a friction fit with the circumferential surface on the rotating member; and the end section in the circumferential direction of the restraining ring is wedged between the bottom surface of the eccentric groove and the circumferential surface around the rotating member.

In a second embodiment of this second aspect of the present invention, the rotation restraining member is a fastening pin that is supported by and fastened to the engaging surface such that the pin protrudes out in the radial direction from the engaging surface, a fastening groove is formed on the surface of the rotating member in the axial direction, and the fastening pin fits in this fastening groove.

In a third embodiment of this second aspect of the present invention, a fastening groove is formed around the engaging surface; the rotation restraining is a friction ring made of synthetic resin; and the friction ring is fitted in the fastening groove.

In a fourth embodiment of this second aspect of the present invention, a fastening concave groove is formed all the way around the engaging concave surface of the rotating ring; the rotation restraining member is an O-ring that has a cross-sectional diameter in the free state that is greater than the depth of the fastening concave groove; the O-ring is mounted in this fastening concave groove; and when the rotating ring is engaged with the rotating member, the O-ring is elastically pressed between the bottom surface of the fastening groove and the surface of the rotating member.

Effect of the Invention

In the wheel support apparatus for a motorcycle of the present invention, by providing the detected surface of the magnetic encoder of the rolling bearing with magnetic encoder, which is one of a pair of rolling bearings, on the inner circumferential surface of a cylinder that extends in the axial direction instead of providing it directly on the plane perpendicular to the axis of rotation that has limited dimensions, it is possible to increase the length in the axial direction thereof, and thus it is possible to increase the surface area per magnetic pole.

By providing the magnetic encoder on the inside surrounded by a pair of bearings and the hub instead of on the fork side where the dimension in the axial direction is limited, it is possible to take advantage of the extra space between both bearings, and thus it is possible to further increase the surface area per magnetic pole of the detected surface of the magnetic encoder, and to improve the precision of rotational speed detection without sacrificing the ease of assembly of the wheel support apparatus for a motorcycle.

Furthermore, by providing a bent section that is bent toward the inside in the radial direction from the outside end in the axial direction of the cylindrical section, it is possible to prevent a drop in rigidity of the cylindrical section that extends in the axial direction.

By making the diameter of the cylindrical section to which the magnetic encoder is attached greater than the inner diameter of the outer ring of the rolling bearing, it is possible to further increase the surface area per magnetic pole.

Alternatively, by using simple construction wherein the magnetic encoder of a rolling bearing with magnetic encoder is mounted and fastened to a slinger, it is possible to do away with the seal lips on the magnetic encoder side, so when compared with conventional technology wherein both seal lips and magnetic encoder are mounted and fastened to one metal core, it is possible to simplify processing and reduce costs.

In the case of any construction above, it is possible to eliminate the seal lips on the magnetic encoder side, so it is reduce resistance to rotation that is cased by the seal lips coming in sliding contact with the outer circumferential surface of the inner ring.

In addition, by fastening a rotation restraining member to the engaging surface of the rotating ring, and by engaging this rotation restraining member with the circumferential surface of the rotating member, it is possible to prevent relative rotation (creep) of the rotating ring on which the encoder is mounted and the opposing member that fits with and supports the rotating ring, and thus it is possible to improve the reliability of the rotational speed detection of a wheel of a motorcycle.

BEST MODES FOR CARRYING OUT THE INVENTION

Embodiment 1

In the following, some embodiments of the wheel support structure for a motorcycle of the present invention will be explained in detail with reference to the accompanying drawings. The basic shape, size, material and the like of the component elements of the wheel support structure of the present invention, unless specially indicated, are the same as the members used in a conventional wheel support structure for a motorcycle. Therefore, the following explanation will center only on the features of each of the embodiments of the present invention, and any explanations of parts that are the same as in the conventional construction will be simplified or omitted. The same will also be true for common parts among the embodiments of the present invention.
[First Aspect]

Figure 1:
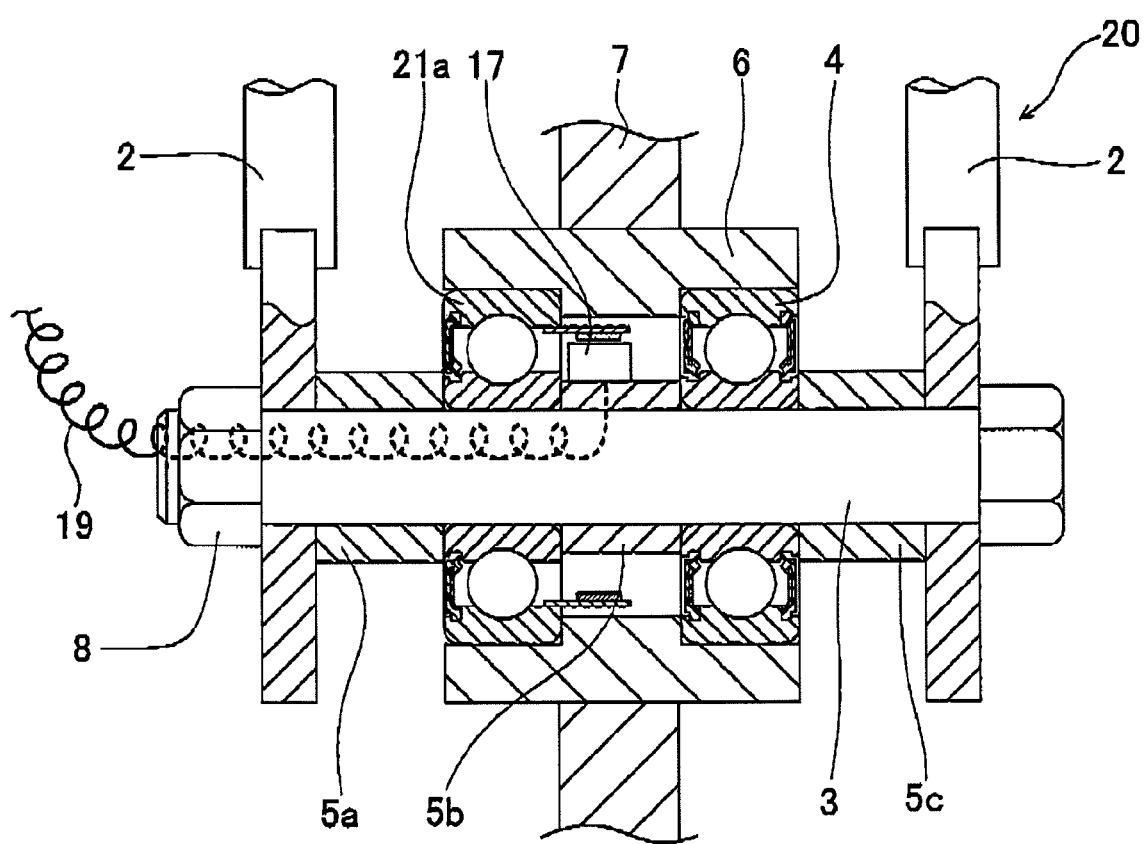
FIG. 1 is a cross-sectional view of an example of a wheel support structure for a motorcycle that is capable of detecting the rotational speed of a wheel to which a first aspect of the present invention is applied.
Figure 2:
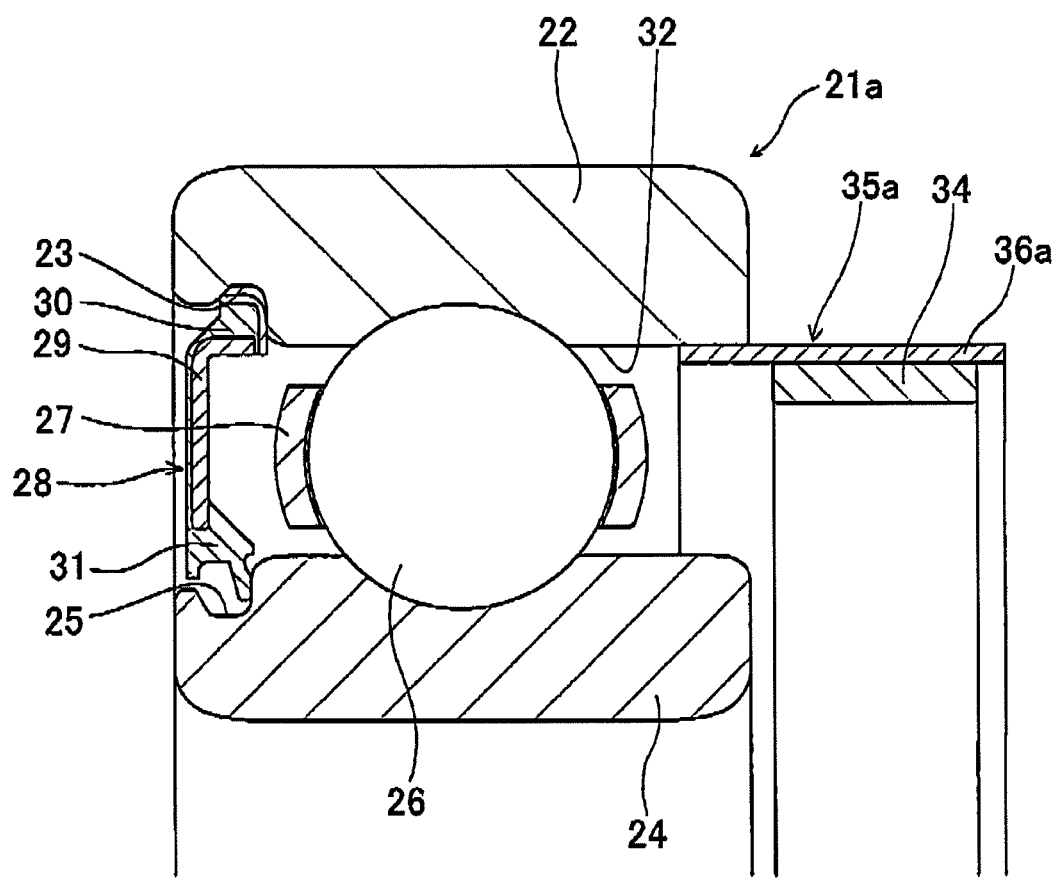
FIG. 2 is a cross-sectional view illustrating first embodiment of a ball bearing with magnetic encoder that is used in the wheel support structure for a motorcycle of the first aspect of the present invention.
Figure 35:
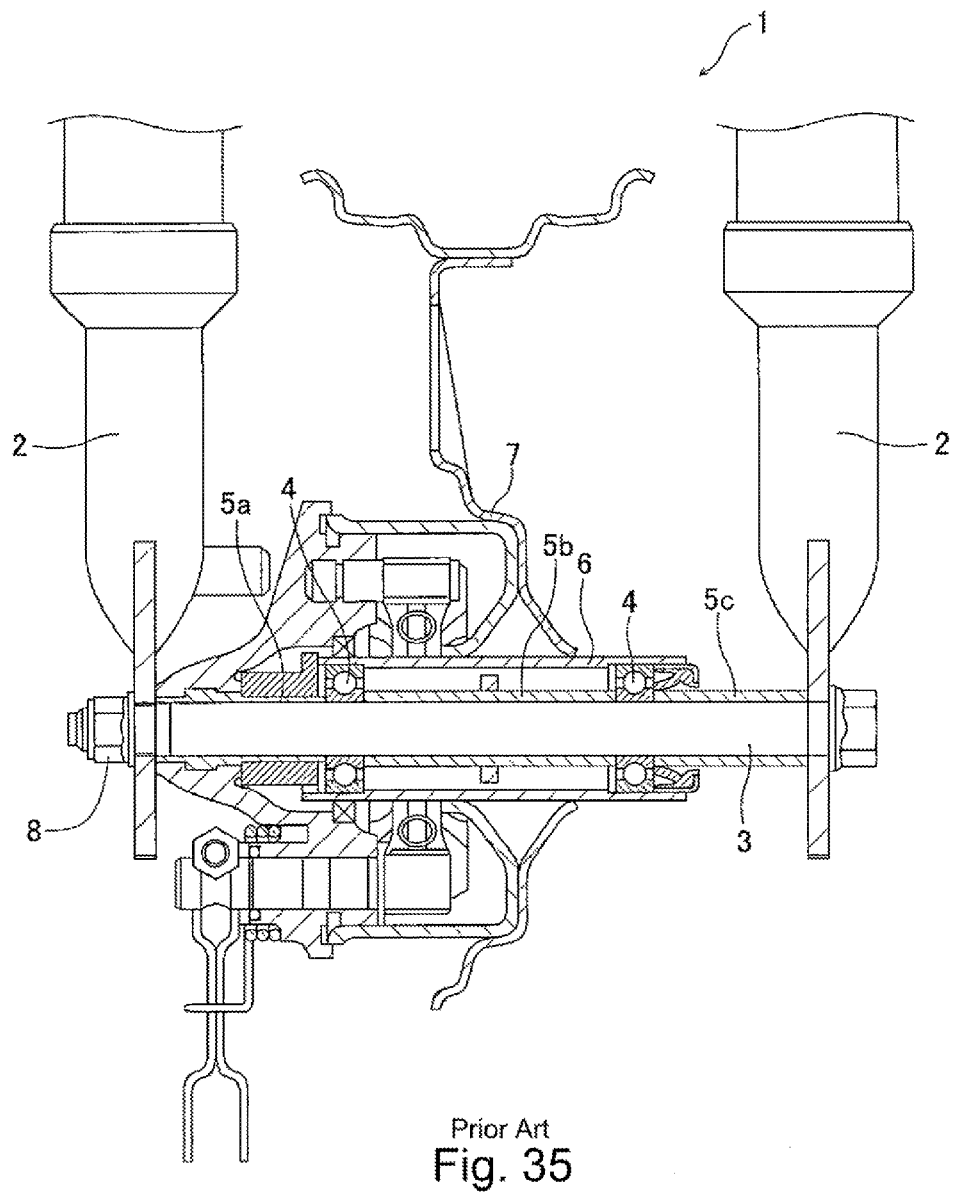
FIG. 35 is a cross-sectional view illustrating an example of a conventional wheel support structure for a motorcycle.
Figure 36:
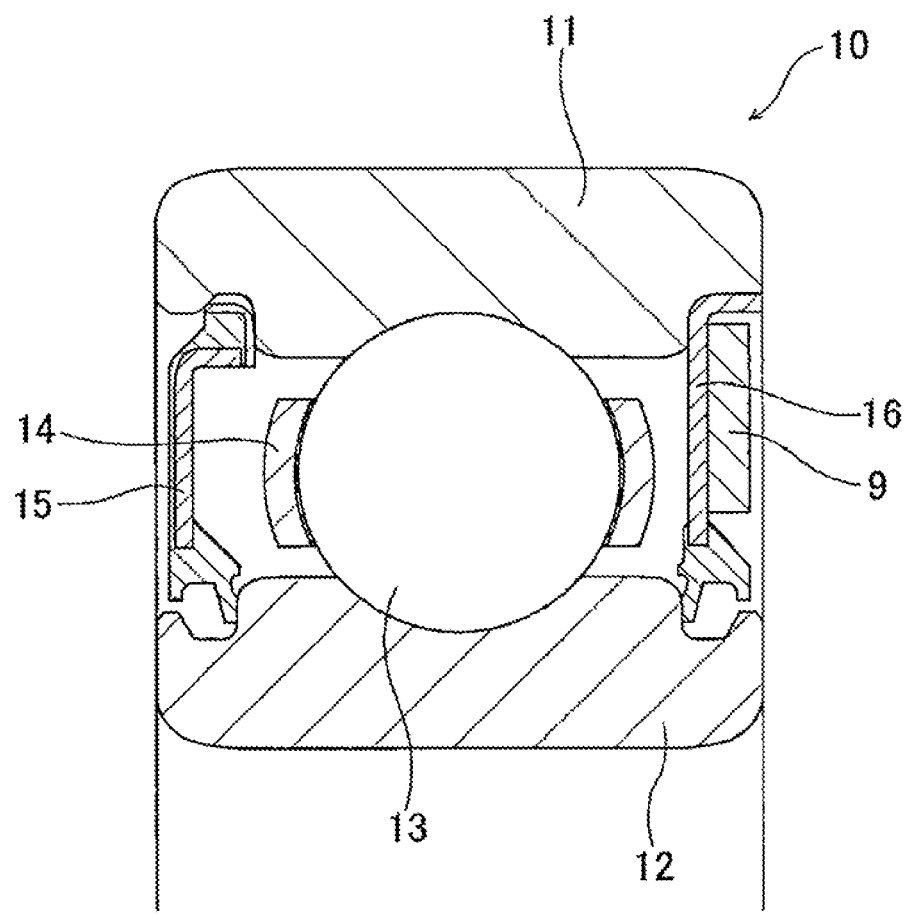
FIG. 36 is a cross-sectional view illustrating an example of a conventional ball bearing with magnetic encoder.
Figure 37:
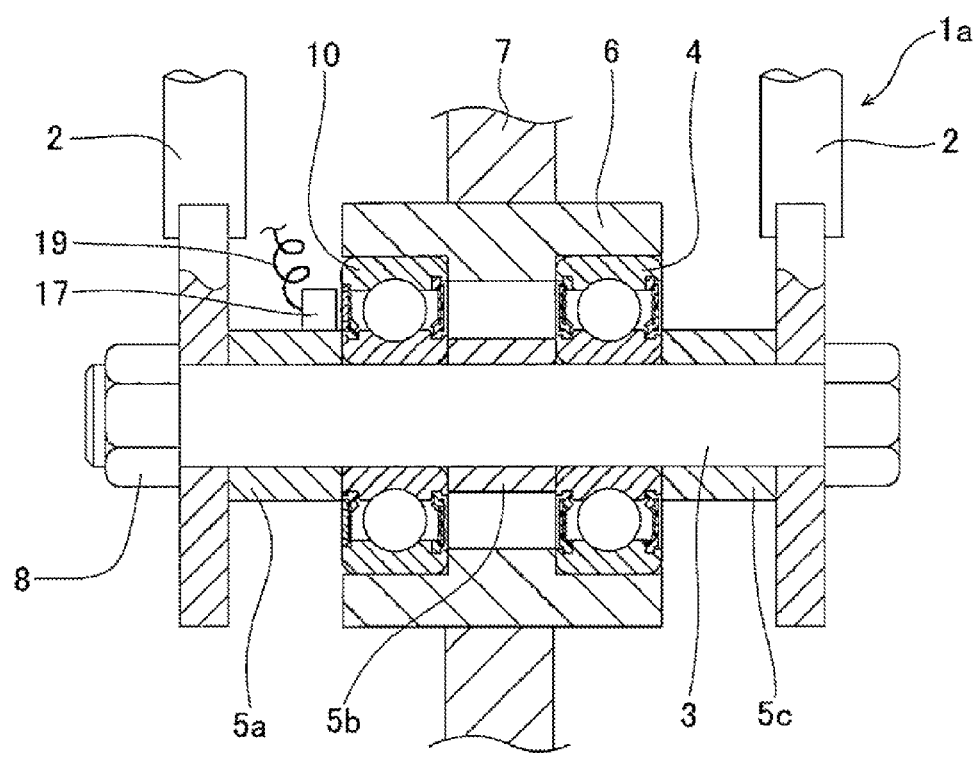
FIG. 37 is a cross-sectional view illustrating an example of a conventional wheel support structure for a motorcycle comprising a ball bearing with magnetic encoder.

FIG. 1 illustrates an example of a wheel support structure for a motorcycle of a first aspect of the present invention. In this wheel support structure 20, for example, the ball bearing 21a with magnetic encoder illustrated in FIG. 2 is substituted for one of the pair of ball bearings 4 that are assembled in the wheel support structure illustrated in FIG. 35, and assembled between the outer circumferential surface of a support shaft 3 and the inner circumferential surface of a hub 6, with a magnetic sensor 17 being fastened to a non-rotating inner ring spacer 5b such that the detecting surface of the magnetic sensor 17 faces the detected surface of a magnetic encoder 34. In FIG. 1, the shape is simplified, however, the basic construction of the wheel support structure of the present invention is the same as the conventional construction illustrated in FIG. 35, and the same reference numbers will be used for identical or equivalent components.

As illustrated in FIG. 1 and FIG. 2, the ball bearing 21a with magnetic encoder, which is the rolling bearing of the present invention, comprises: an outer ring 22, which fits inside the hub 6 and is a rotating ring that rotates together with the wheel 7; an inner ring, which is fastened to the support shaft 3 and is a stationary ring that does not rotate; a plurality of balls 26, which are rolling bodies that are located in the circumferential direction between the outer ring 22 and inner ring 24 such that they can rotate freely; a retainer 27 that holds the plurality of balls 26 at uniform spacing such that they can roll freely; a seal plate 28 that is attached to one of the end sections in the axial direction of the outer ring 22 and comes in sliding contact with the inner ring 24; and a cylindrical shaped encoder installation plate 35a that is attached to the other end in the axial direction of the outer ring 22, with a magnetic encoder 34 being mounted and fastened to the inner circumferential surface thereof.

The seal plate 28 is formed into a ring shape, with the metal core 29, which is a reinforcement member, being covered by an elastic member 30. A seal fastening groove 23 is formed around the inner circumferential surface on one end in the axial direction of the outer ring 22, and by using the elasticity of the elastic member to fit the outer perimeter section of the seal plate 28 into this seal fastening groove 23, the seal plate 28 is fastened to the outer ring 22. A seal groove 25 is formed around the outer circumferential surface of one end in the axial direction of the inner ring 24 that faces the seal fastening groove 23, and seal lips 31 that are provided on the inner perimeter of the seal plate 28 come in sliding contact with the seal groove 25.

In the construction of this first embodiment illustrated in FIG. 2, the encoder installation plate 35a comprises only a single diameter cylindrical shaped cylindrical section 36a, and the portion that is pressure fitted is part of the cylindrical section 36a and has the same diameter as the cylindrical section 36a.

Figure 3:
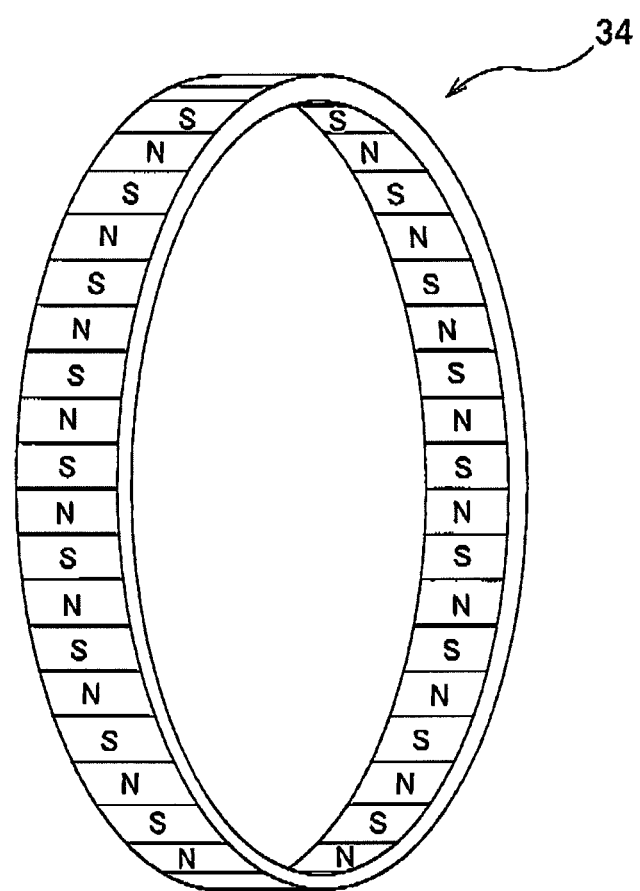
FIG. 3 is a perspective drawing illustrating an example of the magnetization pattern of a magnetic encoder that is provided in the ball bearing with magnetic encoder illustrated in FIG. 2.

As illustrated in FIG. 3, the magnetic encoder 34 is a cylindrical shaped member around which alternating N-poles and S-poles are continuously arranged in the circumferential direction, and this magnetic encoder 34 is mounted and fastened to the inner circumferential surface of the cylindrical shaped encoder installation plate 35a. The encoder installation plate 35a is fastened by pressure fitting or the like to the inner circumferential surface 32 on the other end in the axial direction of the outer ring 22 such that this encoder installation plate 35a rotates together with the outer ring 22.

Figure 4:
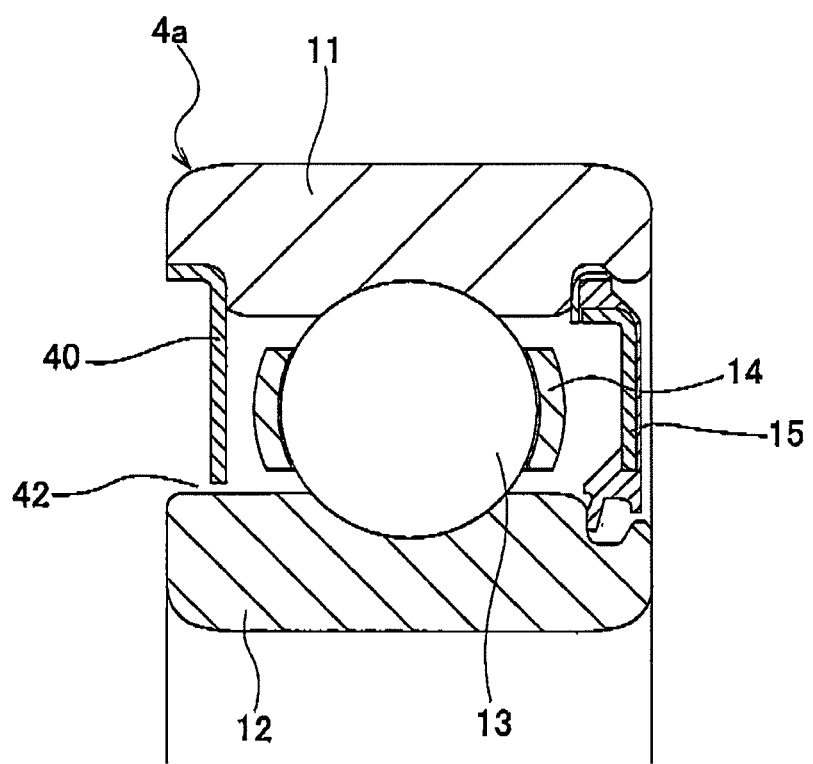
FIG. 4 is a cross-sectional view of an example of a ball bearing on the side without a magnetic encoder that can be used in the present invention.

As illustrated in FIG. 1, this kind of ball bearing 21a with magnetic encoder is assembled between the outer circumferential surface of the support shaft 3 and the inner circumferential surface of the hub 6 so that the magnetic encoder 34 is on the side of the ball bearing 4 that is the other rolling bearing. A conventional single-row ball bearing 4 is used for the other rolling bearing, however, it is possible use a ball bearing 4a having the construction illustrated in FIG. 4 instead. This ball bearing 4a uses a slinger 40, having a labyrinth space 42 between the surface on the inside end thereof and the outer circumferential surface of the inner ring 12, instead of the seal plate 15 of the one rolling bearing which is a rolling bearing with magnetic encoder.

The magnetic sensor 17 detects the rotation of the outer ring by detecting fluctuation in the magnetic flux density that is generated on the detected surface of the magnetic encoder 34 that rotates together with the outer ring as a magnetic pulse. A through hole or a groove, though which the harness 19 passes, is formed in the inner ring spacer 5b, to which the magnetic sensor 17 is attached, and the support shaft 3, and the harness 19 is passed through the hole to the outside without having to pass through rotating parts. The rotational speed information that is detected by the magnetic sensor 17 is transmitted to an external computing device (not illustrated in the figure) by way of the harness 19.

Figure 38:
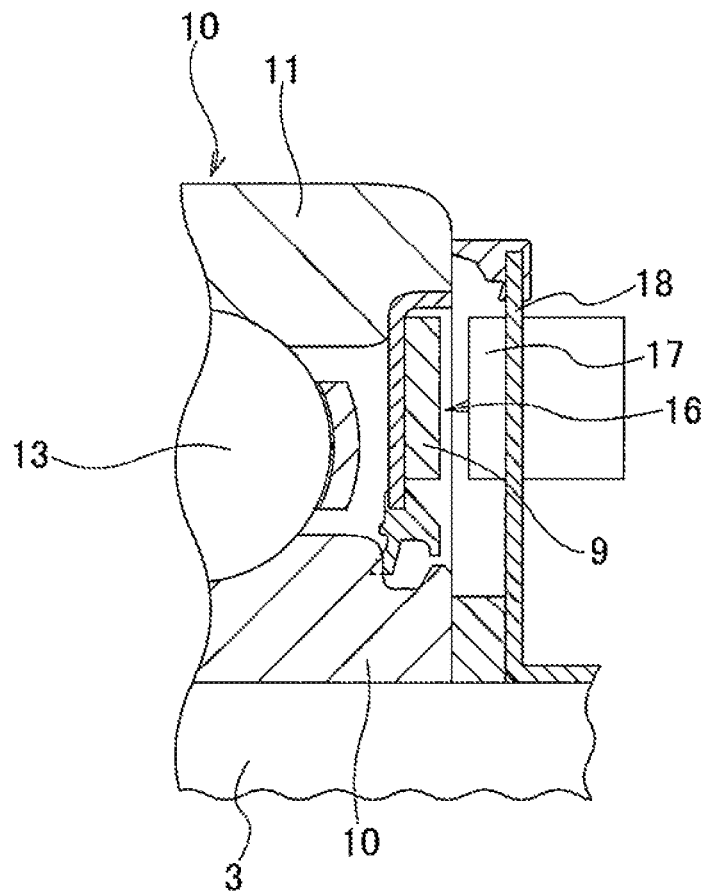
FIG. 38 is a cross-sectional view illustrating a conventional rotational speed detector that is a combination of another example of a conventional ball bearing with magnetic encoder and a magnetic sensor.

In FIG. 1, the magnetic sensor 17 is fastened to the non-rotating inner ring spacer 5b, however, as long as the detecting surface of the sensor faces the detected surface of the magnetic encoder 34 through an appropriate gap, the magnetic sensor 17 can be attached to any member that does not rotate during operation, for example, can be attached directly to the support shaft 3. In other words, in rotating outer ring construction, the support shaft 3, inner ring spacer 5b placed over the support shaft 3, and the holder member 18 (see FIG. 38) for the magnetic sensor 17 that is placed on the support shaft 3 or inner ring spacer 5b are included as members that do not rotate during operation.

Figure 5:
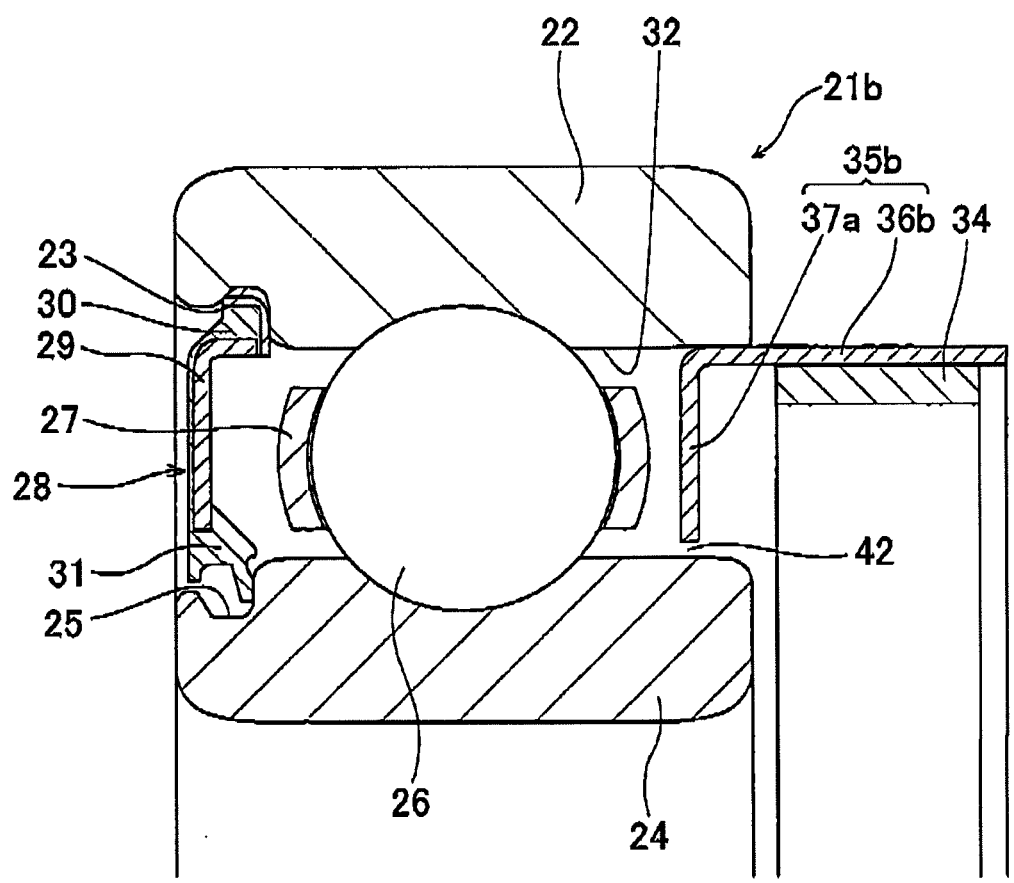
FIG. 5 is a cross-sectional view illustrating a second embodiment of a ball bearing with magnetic encoder that can be used in the wheel support structure for a motorcycle of the first aspect of the present invention.
Figure 6:
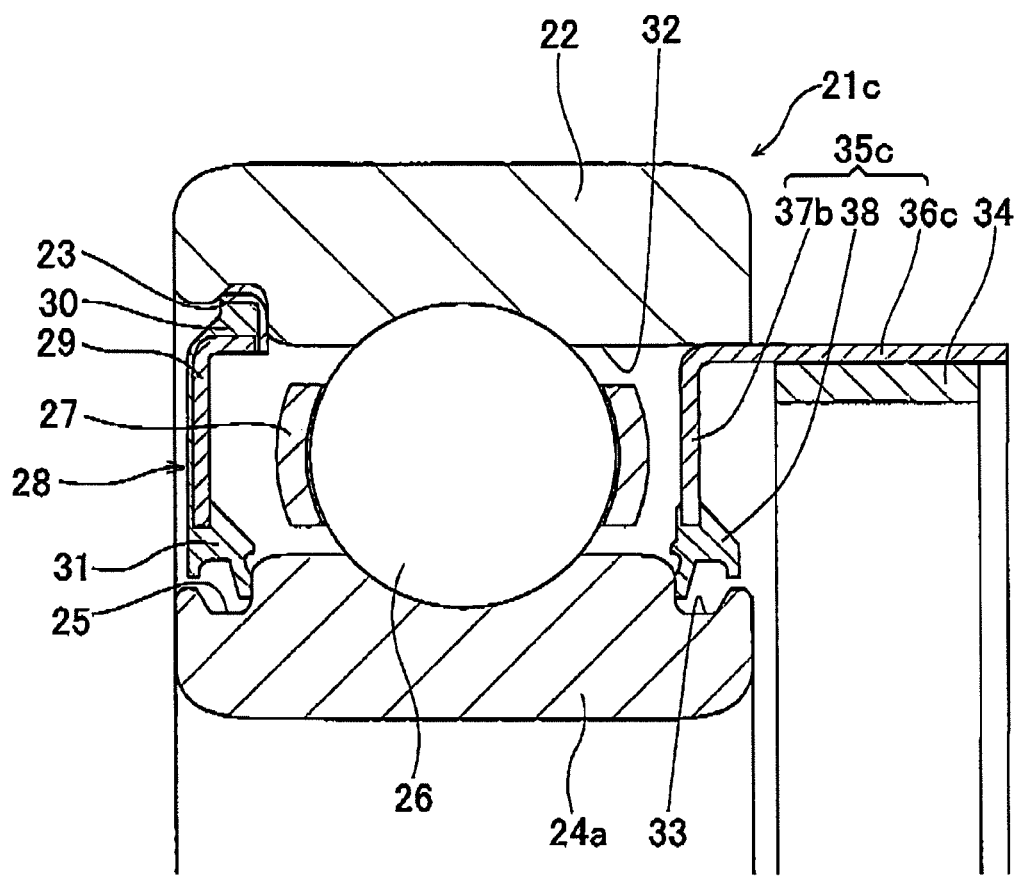
FIG. 6 is a cross-sectional view illustrating a third embodiment of a ball bearing with magnetic encoder that can be used in the wheel support structure for a motorcycle of the first aspect of the present invention.

FIG. 5 and FIG. 6 illustrate other embodiments of a ball bearing with magnetic encoder that is used in the wheel support structure illustrated in FIG. 1 and FIG. 2. In the second embodiment illustrated in FIG. 5, the encoder installation plate 35b of the ball bearing 21b with magnetic encoder comprises a cylindrical section 36b, an circular disk section (sealed section) 37a that is bent toward the inside in the radial direction on one end in the axial direction of the cylindrical section 36b. A labyrinth seal 42 can be formed between the circular disk section 37a and the outer circumferential surface of the inner ring 24 in order to prevent lubricant, such as grease, inside the bearing 21b from flowing out, so there is no need to add a separate seal for suppressing the flow of grease.

In a third embodiment illustrated in FIG. 6, the encoder installation plate 35c of the ball bearing 21c with magnetic encoder comprises a cylindrical section 36c, a circular disk section (sealed section) 37b that is bend inward in the radial direction on one end in the axial direction of the cylindrical section 36c and seal lips 38 that are provided on the inner perimeter section of the circular disk section 37b. A seal groove 33 that is similar to the seal groove 25 on the surface of the other end is formed around the outer circumferential surface of the end section on the encoder side in the axial direction of the inner ring 24 of the ball bearing 21c with magnetic encoder, and the seal lips 38 come in sliding contact with this seal groove 33. With this construction, it is possible to further improve the seal of the ball bearing 21c with magnetic encoder.

FIG. 7 to FIG. 10 illustrate variations of the embodiments of a ball bearing with magnetic encoder illustrated in FIG. 2, FIG. 5 and FIG. 6 that are used in a wheel support structure for a motorcycle. In the variation of the first embodiment illustrated in FIG. 7, a pressure fitting stepped section 41, having a diameter that is larger than the diameter of the inner circumferential surface 32a of the other end section of the rolling bearing, or in other words, the end section on the opposite side from the end section where the seal plate 28 is installed, is formed in the outer ring 22a of the ball bearing 21d with magnetic encoder; and the encoder installation plate 35d is pressure fitted and fastened in this pressure fitting stepped section 41. The encoder installation plate 35d has a diameter that is greater than the diameter of the inner circumferential surface 32a, however, as in the first example, is a single diameter cylindrical shape and has the same diameter as the pressure fitting section and the cylindrical section. By making the diameter of the encoder installation plate 35d as large as possible within the limits that the strength of the outer ring 22a and the inner diameter of the hub 6 will allow, it is also possible to made the diameter of the magnetic encoder 34a large, and thus it becomes possible to increase the amount of surface area per magnetic pole of the magnetic encoder 34a. The inner circumferential surface of the outer ring is taken to be only the part of the circumferential surface of the inner diameter side of the outer ring that exists on the very most inner diameter side in the portion adjacent to the raceway surface.

Figure 7:
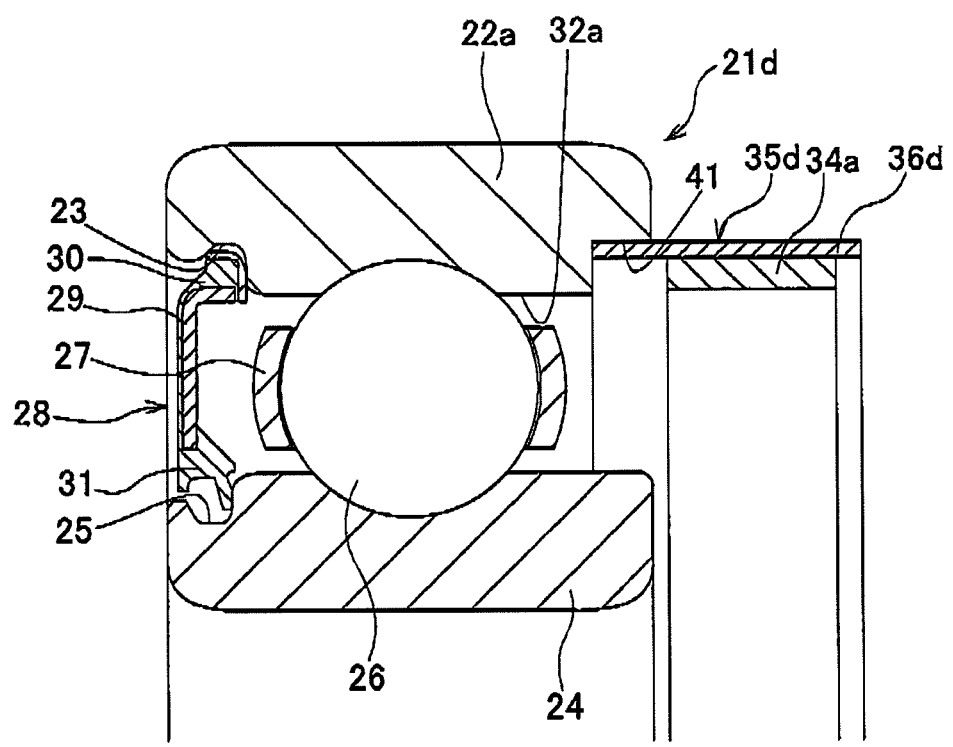
FIG. 7 is a cross-sectional view illustrating a variation of the first embodiment of a ball bearing with magnetic encoder that can be used in the wheel support structure for a motorcycle of the first aspect of the present invention.
Figure 8:
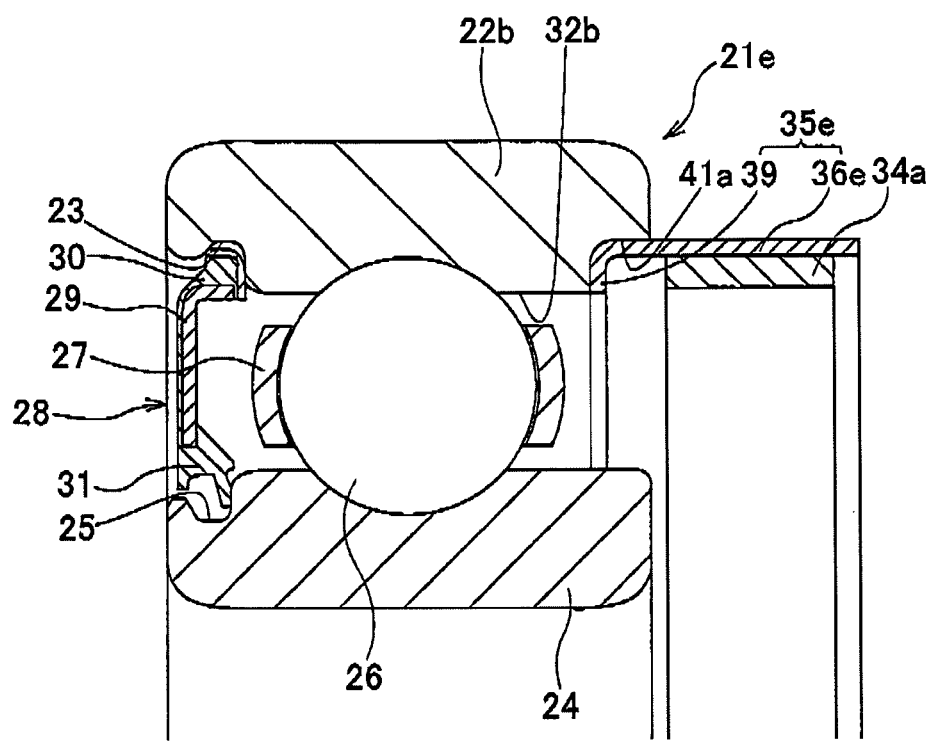
FIG. 8 is a cross-sectional view illustrating another variation of the first embodiment of a ball bearing with magnetic encoder that can be used in the wheel support structure for a motorcycle of the first aspect of the present invention.

In another variation of the first embodiment illustrated in FIG. 8, the ball bearing 21e with magnetic encoder differs from the ball bearing 21d with magnetic encoder illustrated in FIG. 7 only in that shape of the encoder installation plate 35e and the shape of the pressure fitting stepped section 41a that is formed to fit that shape differ. The encoder installation plate 35e comprises a cylindrical section 36e and a bent section 39 that is bent toward the inside in the radial direction on the inside end in the axial direction of the cylindrical section 36e. The bent section 39 comes in contact with the surface on the side of the pressure fitting stepped section 41a, making it possible to set the position of the magnetic encoder 34a in the axial direction.

Figure 9:
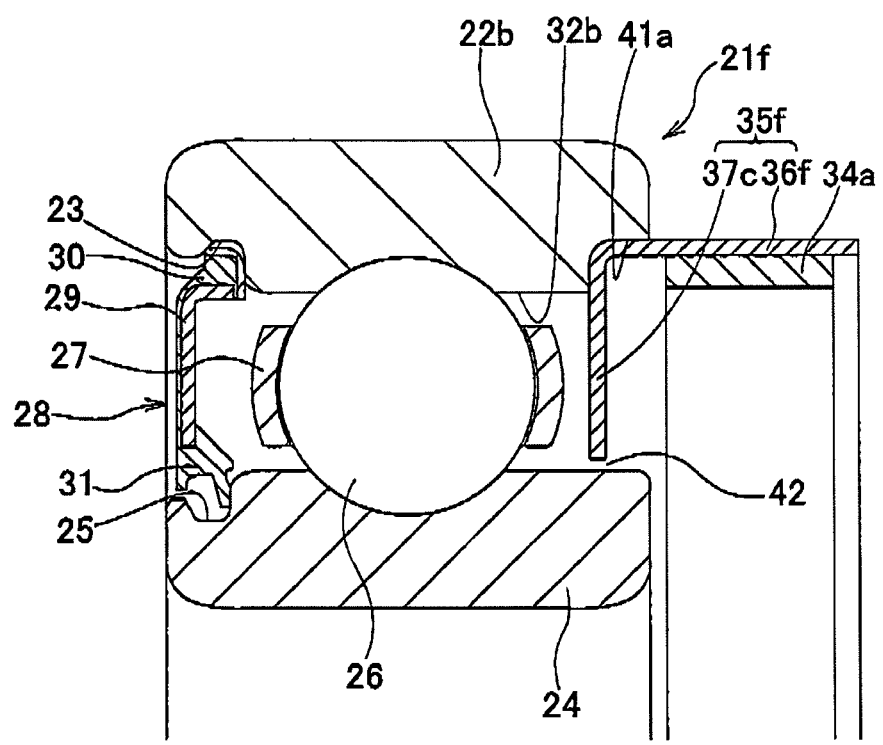
FIG. 9 is a cross-sectional view illustrating a variation of the second embodiment of a ball bearing with magnetic encoder that can be used in the wheel support structure for a motorcycle of the first aspect of the present invention.

In the variation of the second embodiment illustrated in FIG. 9, the ball bearing 21f with magnetic encoder differs from the ball bearing 21d with magnetic encoder illustrated in FIG. 7 only in that shape of the encoder installation plate 35f differs. As in the second embodiment, the encoder installation plate 35f of the ball bearing 21f with magnetic encoder comprises a circular disk section (sealed section) 37c that is bent toward the inside in the radial direction from the end in the axial direction of the cylindrical section 36f such that the surface on the end on the inner diameter side comes close to the outer circumferential surface of the inner ring 24.

Figure 10:
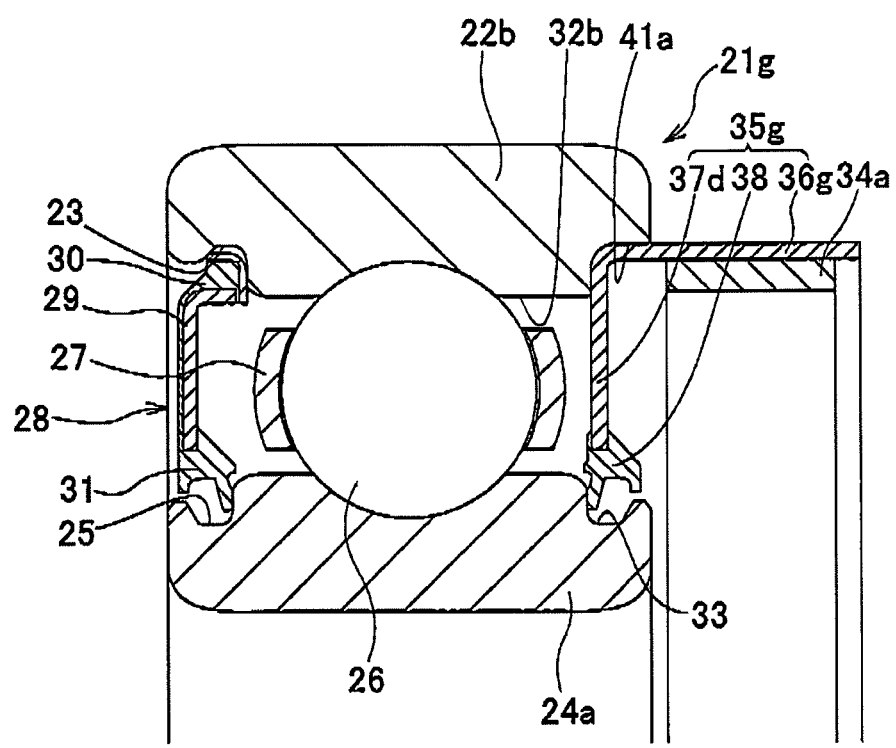
FIG. 10 is a cross-sectional view illustrating a variation of the third embodiment of a ball bearing with magnetic encoder that can be used in the wheel support structure for a motorcycle of the first aspect of the present invention.
Figure 11:
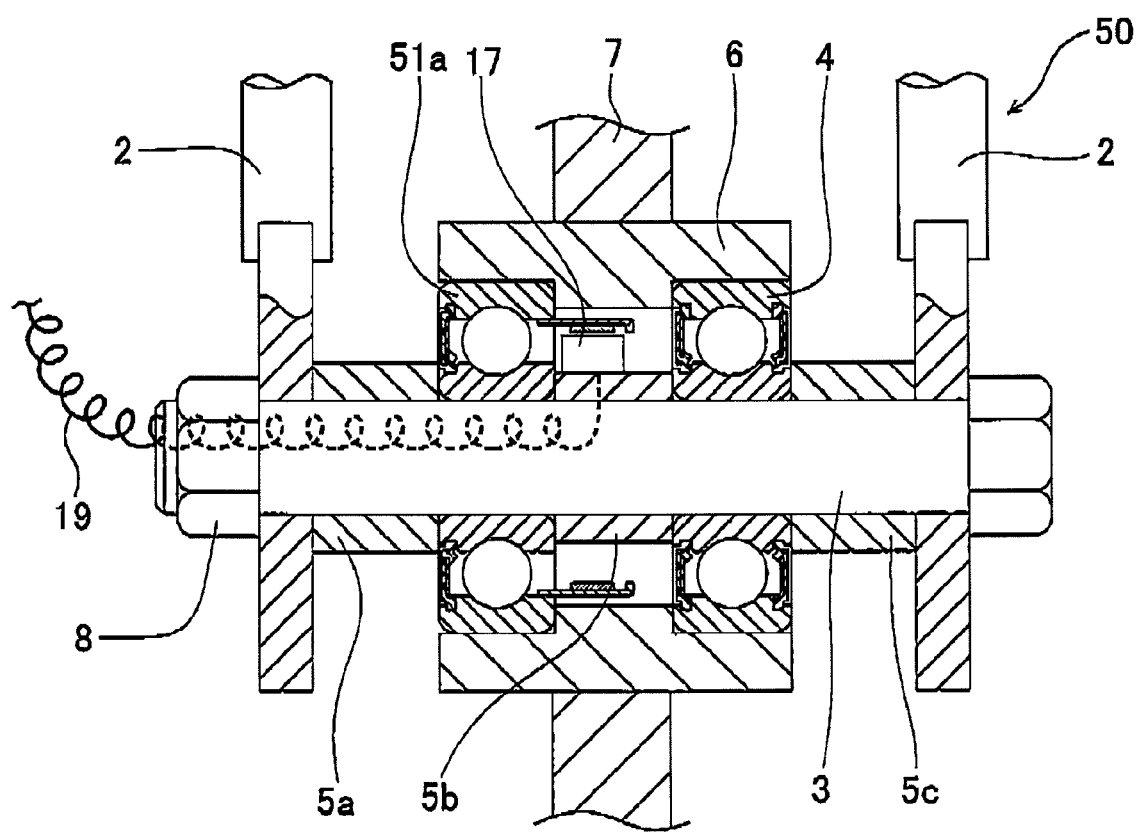
FIG. 11 is a cross-sectional view of another example of a wheel support structure for a motorcycle that is capable of detecting the rotational speed of a wheel to which a first aspect of the present invention is applied.
Figure 12:
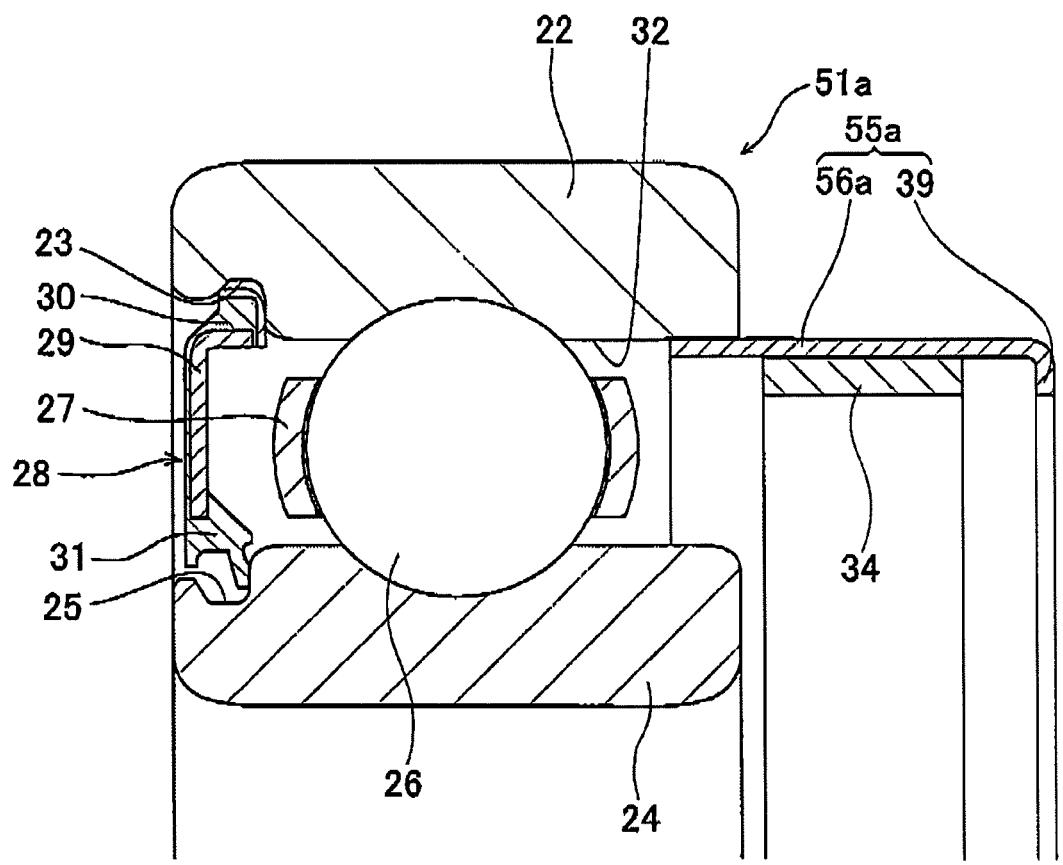
FIG. 12 is a cross-sectional view illustrating a fourth embodiment of a ball bearing with magnetic encoder that can be used in the wheel support structure for a motorcycle of the first aspect of the present invention.

In the variation of the third embodiment illustrated in FIG. 10, the ball bearing 21g with magnetic encoder differs from the ball bearing 21d with magnetic encoder illustrated in FIG. 7 only in that the shape of the encoder installation plate 35g differs. As in the third embodiment, the encoder installation plate 35g of the ball bearing 21g with magnetic encoder comprises a circular disk section (sealed section) 37d that is bent toward the inside in the radial direction from the inside end in the axial direction of the cylindrical section 36g, and seal lips 38 that are provided on the inner perimeter section of circular disk section 37d. A seal groove 33 that is similar to the seal groove 25 on the surface of the other end is formed around the outer circumferential surface on the encoder side in the axial direction of the inner ring 24a of the ball bearing 21g with magnetic encoder, and the seal lips 38 come in sliding contact with the seal groove 33.

FIG. 11 to FIG. 16 are drawings illustrating another example of a wheel support structure for a motorcycle that is capable of detecting the rotational speed of a wheel, to which the first aspect of the present invention is applied. In this example, only the shape of the encoder installation plate of the ball bearing with magnetic encoder differs from the shapes in the first through third embodiments. In a fourth embodiment illustrated in FIG. 11 and FIG. 12, the encoder installation plate 55a is pressure fitted into the other end section on the rolling bearing side in the axial direction of the outer ring 22, or in other words, is pressure fitted into the inner circumferential surface 32 of the end section on the opposite side from the end section where the seal plate 28 is installed, and comprises a cylindrical section 56a that extends outward in the axial direction from the outer ring 22a, and a bent section 39 that is bent toward the inside in the radial direction from the outer end in the axial direction of the cylindrical section 56a. The bent section 39 prevents a drop in rigidity due to the length of the cylindrical section 56a becoming longer, and functions as a pressure section for pressure fitting the encoder installation plate 55a into the outer ring 22.

Figure 13:
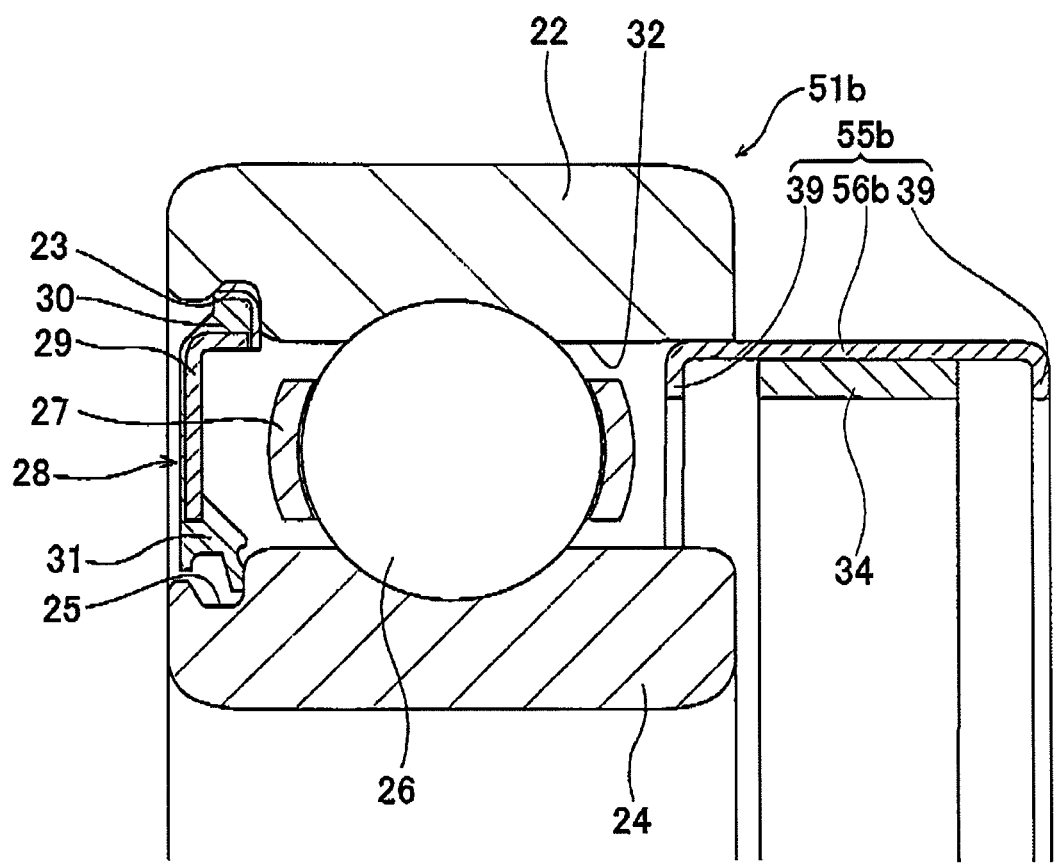
FIG. 13 is a cross-sectional view illustrating a variation of the fourth example of a ball bearing with magnetic encoder that can be used in the wheel support structure for a motorcycle of the first embodiment of the present invention.

In a variation of the fourth embodiment illustrated in FIG. 13, the encoder installation plate 55b of the ball bearing 51b with magnetic encode has bent sections 39 that are formed on both ends in the axial direction of the cylindrical section 56b. As a result, the encoder installation plate 55b does not have directionality when being pressure fitted into the outer ring 22, so can improve workability.

Figure 14:
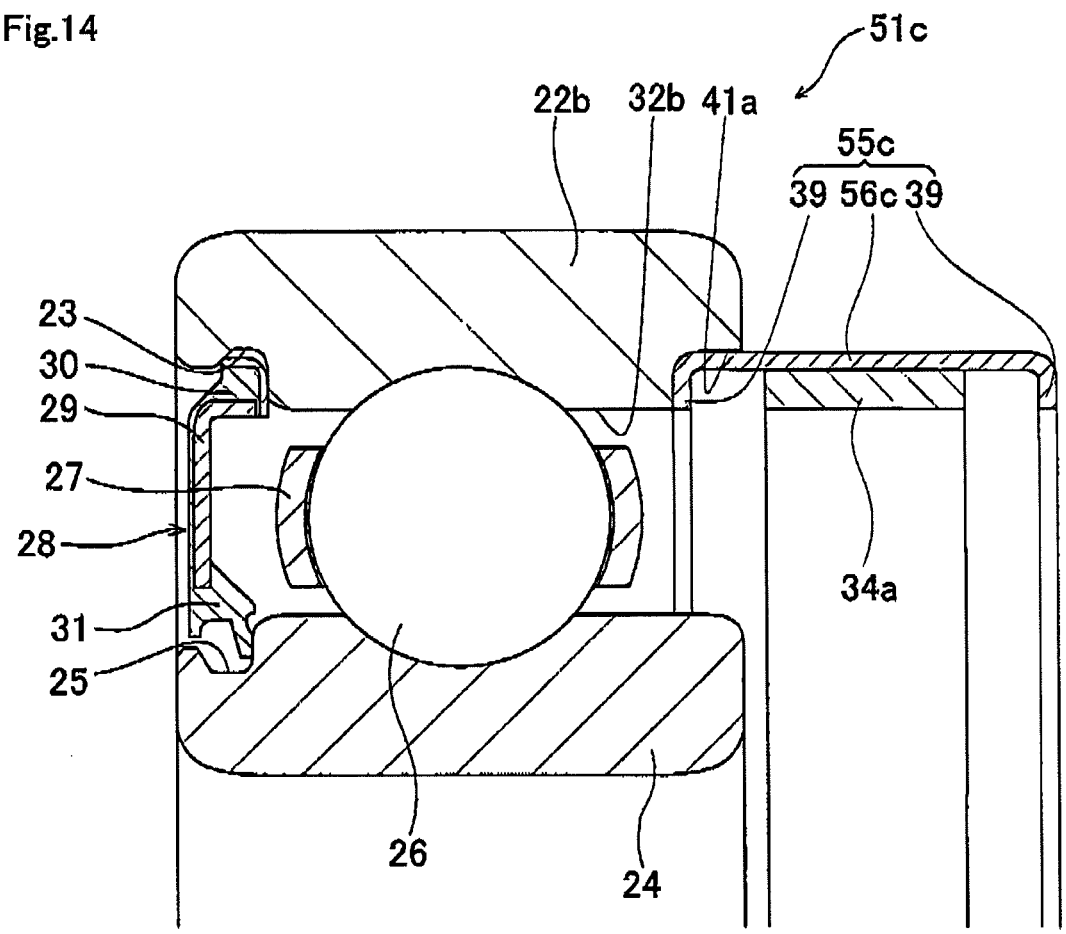
FIG. 14 is a cross-sectional view illustrating another variation of the fourth embodiment of a ball bearing with magnetic encoder that can be used in the wheel support structure for a motorcycle of the first aspect of the present invention.

In the variation of the fourth embodiment illustrated in FIG. 14, a pressure fitting stepped section 41a having a larger diameter than the diameter of the inner circumferential surface 32b on the other end section on the rolling bearing side in the axial direction of the outer ring 22b is formed in the ball bearing 51c with magnetic encoder in order to pressure fit the encoder installation plate 55c into the inner circumferential surface 32b. The encoder installation plate 55c comprises a large-diameter cylindrical section 56c that is pressure fitted into the pressure fitting stepped section 41a of the outer ring 22b, and bent sections 39 that are bent toward the inside in the radial direction on both ends in the axial direction of the cylindrical section 56c. By making the diameter of the encoder installation plate 55c as large as possible within the limits of the strength of the outer ring and inner diameter of the hob 6, the surface area per magnetic pole of the magnetic encoder 34a can be increased.

Figure 15:
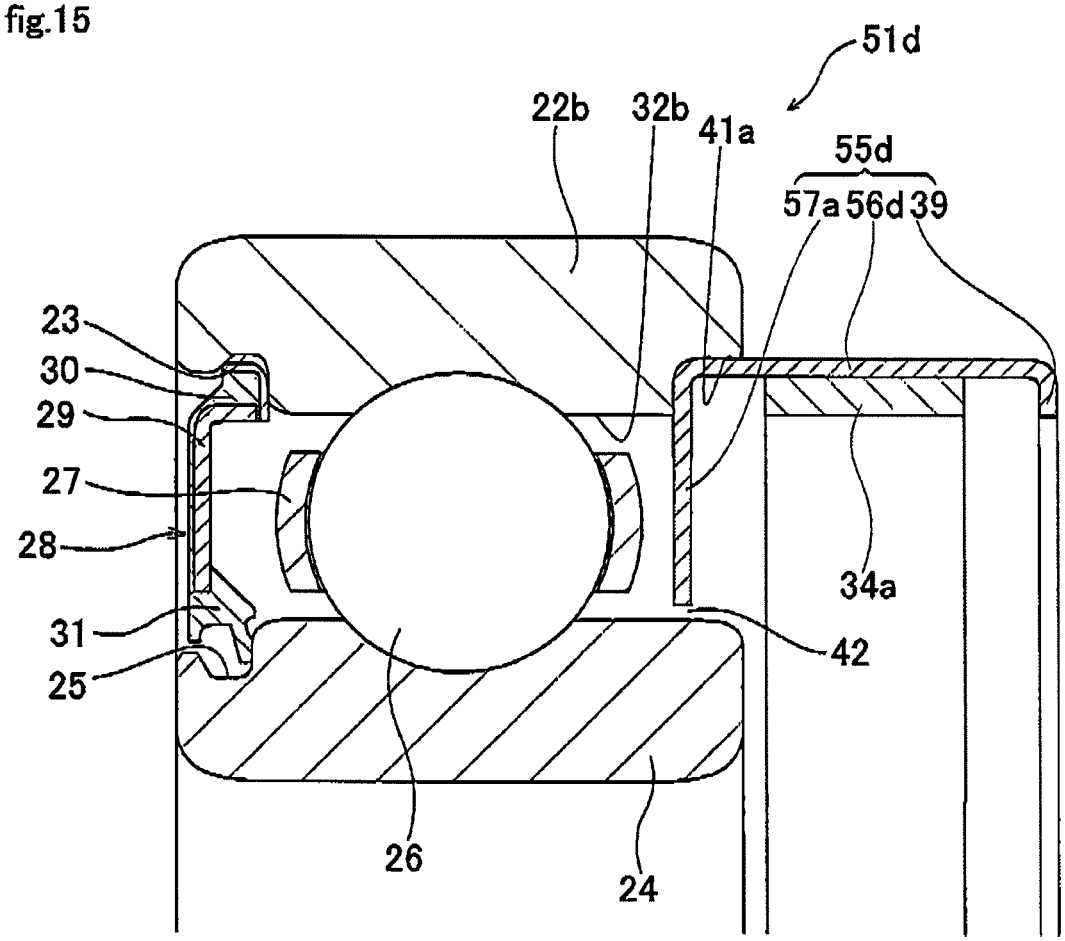
FIG. 15 is a cross-sectional view illustrating a fifth embodiment of a ball bearing with magnetic encoder that can be used in the wheel support structure for a motorcycle of the first aspect of the present invention.

In a fifth embodiment illustrated in FIG. 15, the encoder installation plate 55d of the ball bearing 51d with magnetic encoder comprises a circular disk section (sealed section) 57a on the inside end in the axial direction of the cylindrical section 56d instead of a bent section 39, and this circular disk section 57a extend toward the inside in the radial direction such that the surface on the end on the inner diameter side come very close to the outer circumferential surface of the inner ring 24.

Figure 16:
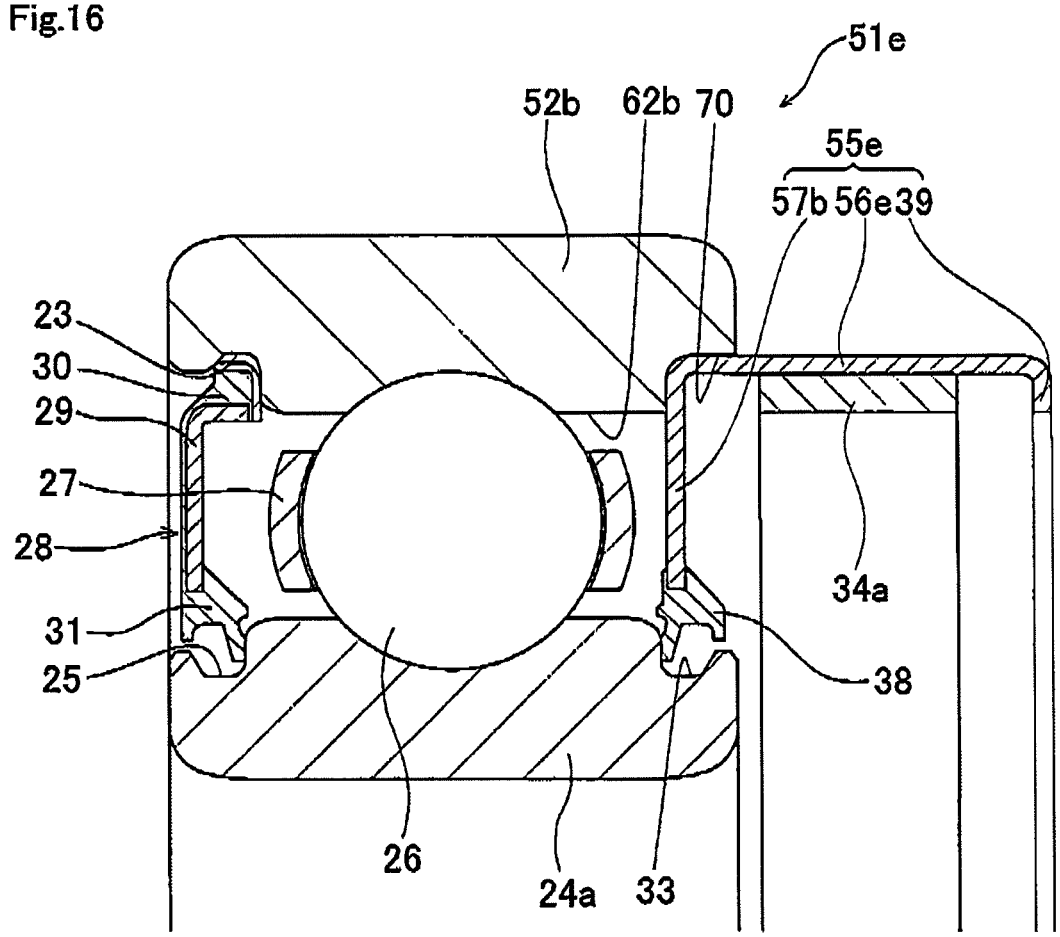
FIG. 16 is a cross-sectional view illustrating a sixth embodiment of a ball bearing with magnetic encoder that can be used in the wheel support structure for a motorcycle of the first aspect of the present invention.
Figure 17:
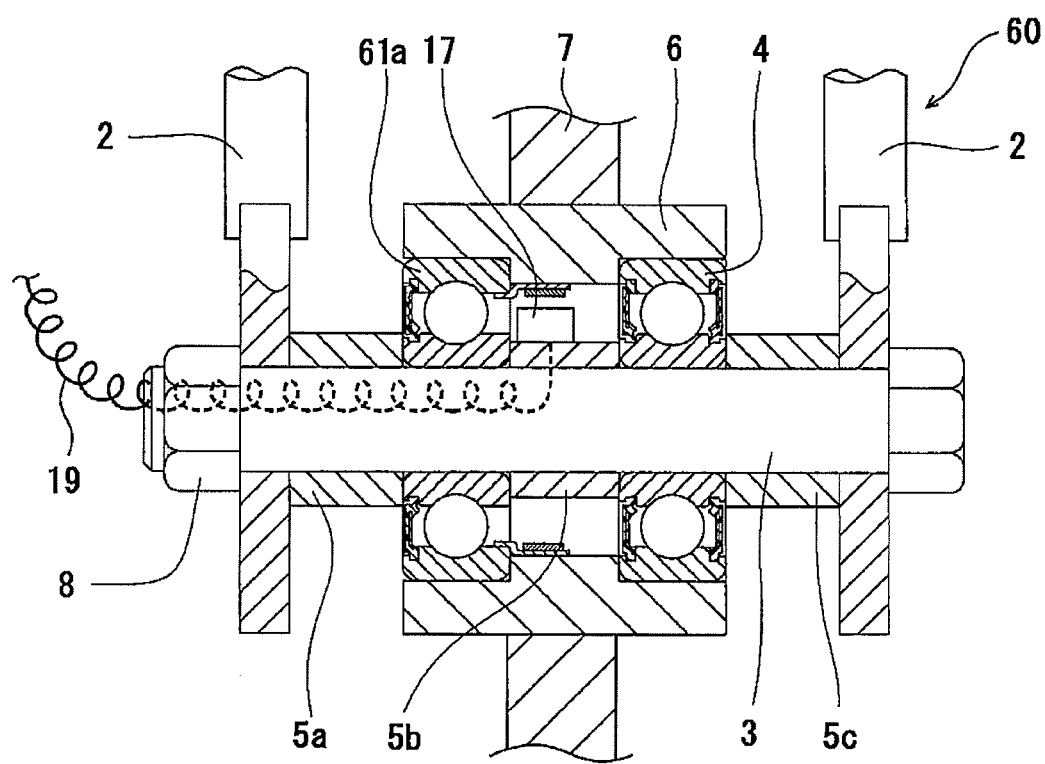
FIG. 17 is a cross-sectional view of yet another example of a wheel support structure for a motorcycle that is capable of detecting the rotational speed of a wheel to which a first aspect of the present invention is applied.
Figure 18:
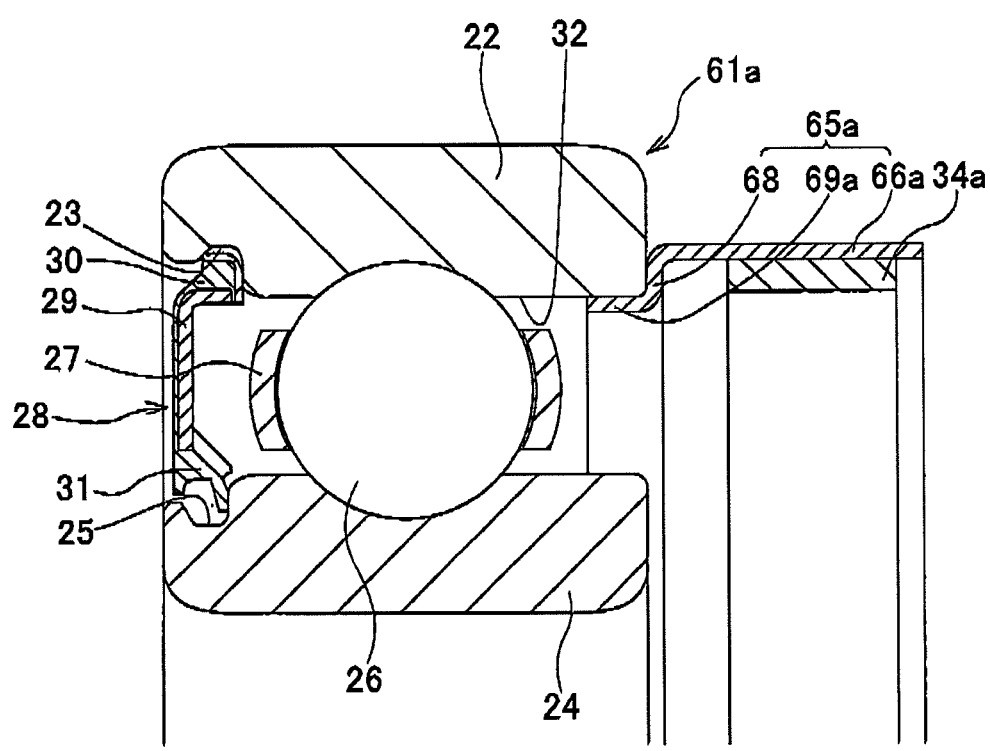
FIG. 18 is a cross-sectional view illustrating a seventh embodiment of a ball bearing with magnetic encoder that can be used in the wheel support structure for a motorcycle of the first aspect of the present invention.

In a sixth embodiment illustrated in FIG. 16, the encoder installation plate 55e of the ball bearing 51e with magnetic encoder comprises a circular disk section (sealed section) 57b that extends toward the inside in the radial direction on the inside end in the axial direction of the cylindrical section 56e instead of a bent section 39, and seal lips 38 that are provided on the inner perimeter section of the circular disk section 57b.

FIG. 17 to FIG. 20 are drawings illustrating yet another example of a wheel support structure for a motorcycle that is capable of detecting the rotational speed of a wheel to which the first aspect of the present invention is applied. In this example, only the shape of the encoder installation plate of the ball bearing with magnetic encoder differs from the first through third embodiments. In a seventh embodiment illustrated in FIG. 17 and FIG. 18, the encoder installation plate 65a of the ball bearing 61a with magnetic encoder comprises a cylindrical shaped pressure fitting section 69a that is pressure fitted into the inner circumferential surface 32 of the outer ring 22, a cylindrical section 66a having a diameter that is larger than the diameter of the inner circumferential surface 32 of the outer ring 22 and to which the magnetic encoder 34a is mounted and fastened around the inner circumferential surface thereof, and a circular disk section 68 that connects the pressure fitting section 69a and the cylindrical section 66a. This cylindrical disk section 68 comes in contact with the end surface of the outer ring 22, making it possible to set the position in the axial direction of the magnetic encoder 34a. Moreover, the cylindrical section 66a, by having a diameter as large as possible that is allowed within the limit of the inner diameter of the hub 6, can increase the surface area per magnetic pole of the magnetic encoder 34a. The pressure fitting section 69a is pressure fitted into the inner circumferential surface 32 of the other end section on the rolling bearing side in the axial direction of the outer ring 22, and is fastened so as to rotate together with the outer ring 22.

Figure 19:
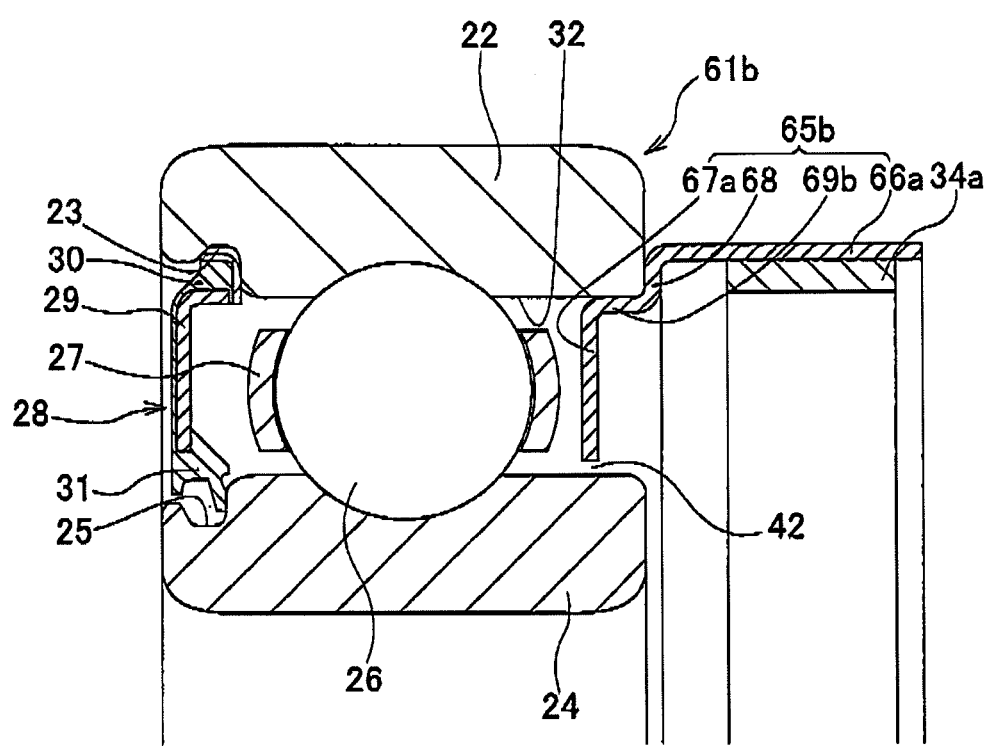
FIG. 19 is a cross-sectional view illustrating an eighth embodiment of a ball bearing with magnetic encoder that can be used in the wheel support structure for a motorcycle of the first aspect of the present invention.

In the eighth embodiment illustrated in FIG. 19, the encoder installation plate 65b of the ball bearing 61b with magnetic encoder comprises a circular disk section (sealed section) 67a that is bent toward the inside in the radial direction on the inside end in the axial direction of the pressure fitting section 69b such that the end surface on the inner diameter side comes very close to the outer circumferential surface of the inner ring 24. A labyrinth seal 42 is formed between the sealed section 67a and the outer circumferential surface of the inner ring 24, preventing lubricant such as grease inside the bearing 61b from flowing out.

Figure 20:
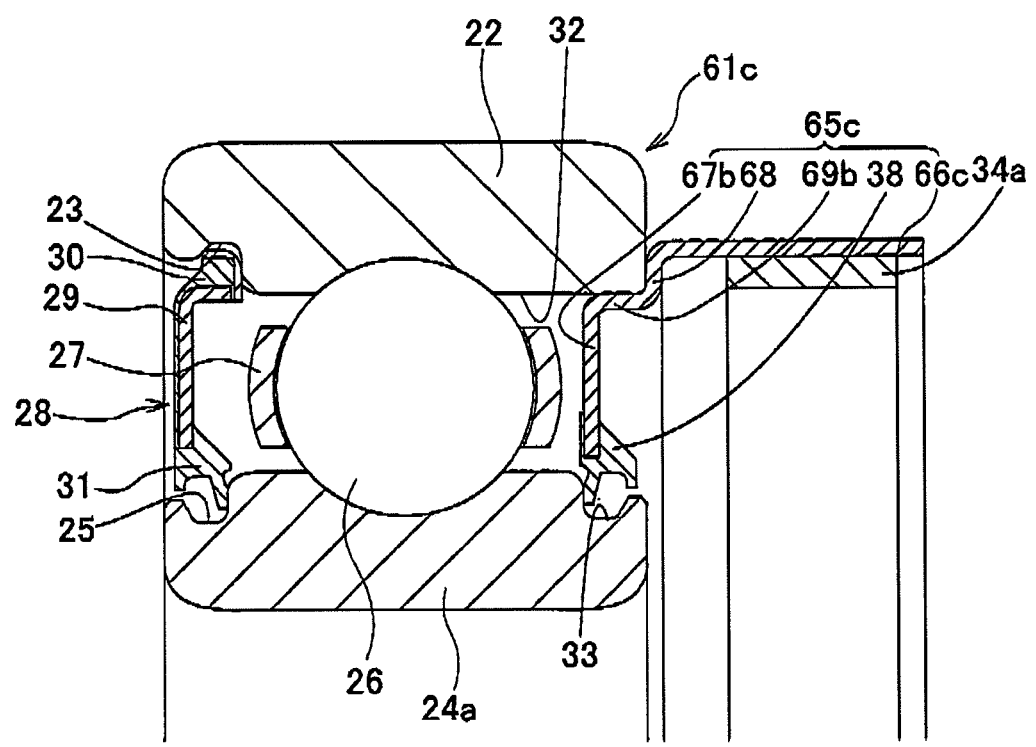
FIG. 20 is a cross-sectional view illustrating a ninth embodiment of a ball bearing with magnetic encoder that can be used in the wheel support structure for a motorcycle of the first aspect of the present invention.

In the ninth embodiment illustrated in FIG. 20, the encoder installation plate 65c of the ball bearing 61c with magnetic encoder comprises a circular disk section (sealed section) 67b that is bent toward the inside in the radial direction on the inside end in the axial direction of the pressure fitting section 69b, and seal lips 38 that are provided on the inner perimeter section of the sealed section 67b. On the other hand, a seal groove 33 that is similar to the seal groove on the surface on the other end is formed around the outer circumferential surface of the end section on the encoder side in the axial direction of the inner ring 24a of the ball bearing 61c with magnetic encoder, and the seal lips 38 come in sliding contact with this seal groove 33.

Figure 21:
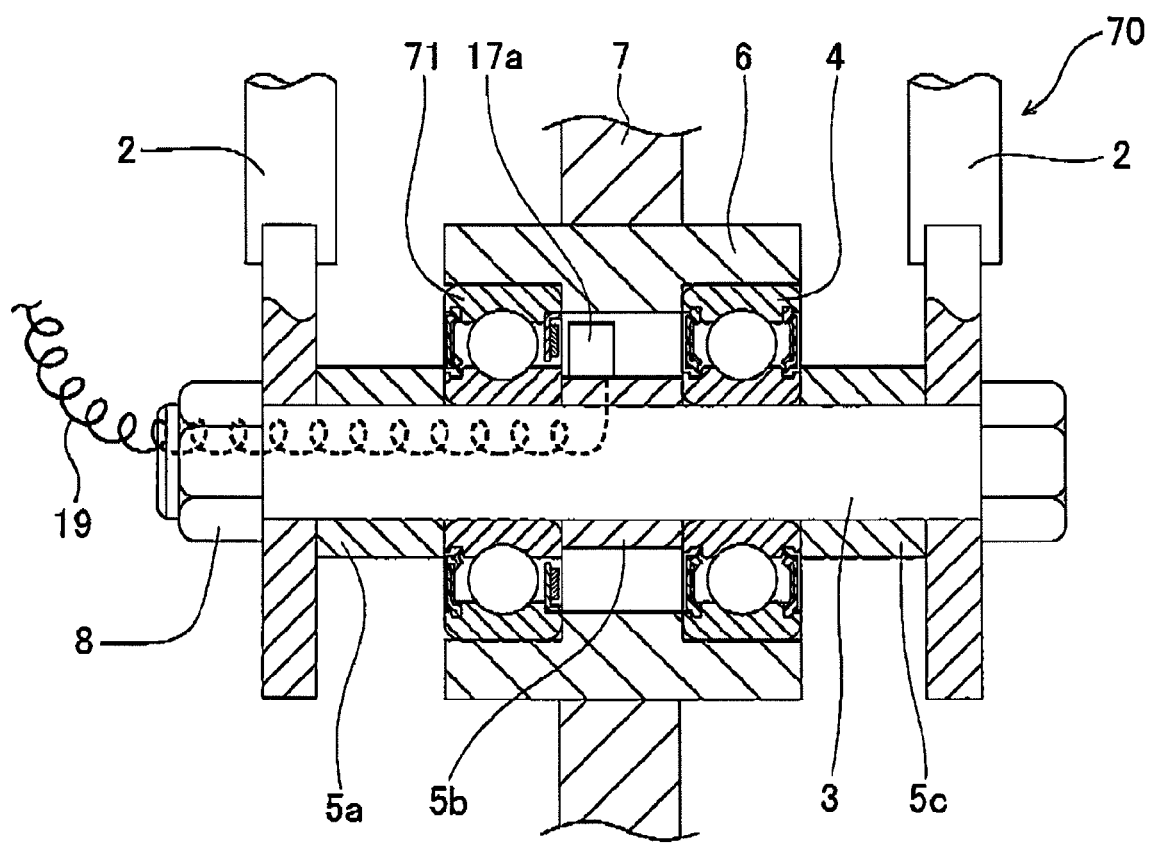
FIG. 21 is a cross-sectional view of another example of a wheel support structure for a motorcycle that is capable of detecting the rotational speed of a wheel to which a first aspect of the present invention is applied.
Figure 22:
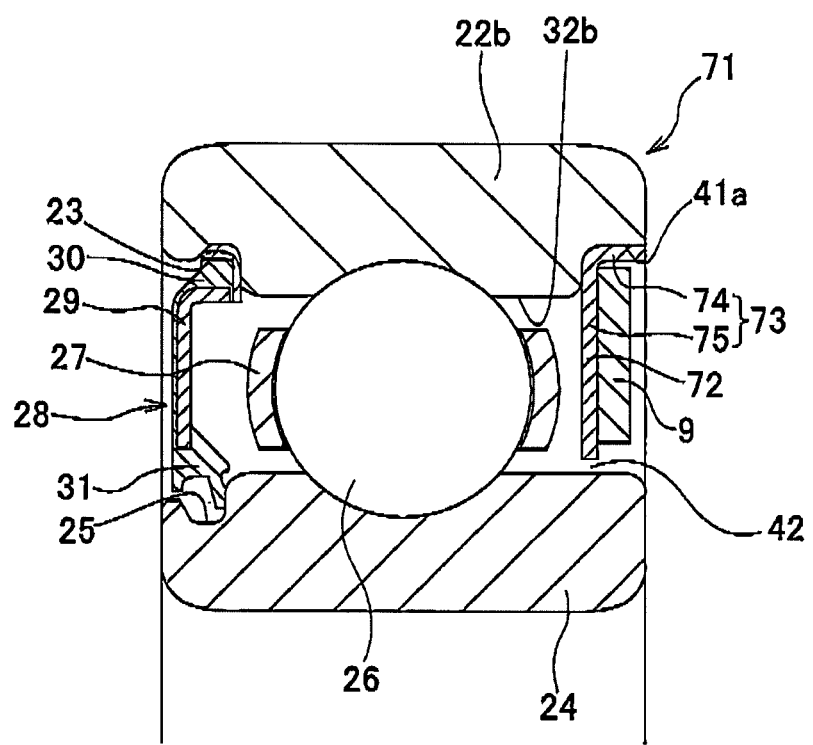
FIG. 22 is a cross-sectional view illustrating a ball bearing with magnetic encoder that can be used in another example of the wheel support structure for a motorcycle of the first aspect of the present invention.
Figure 23:
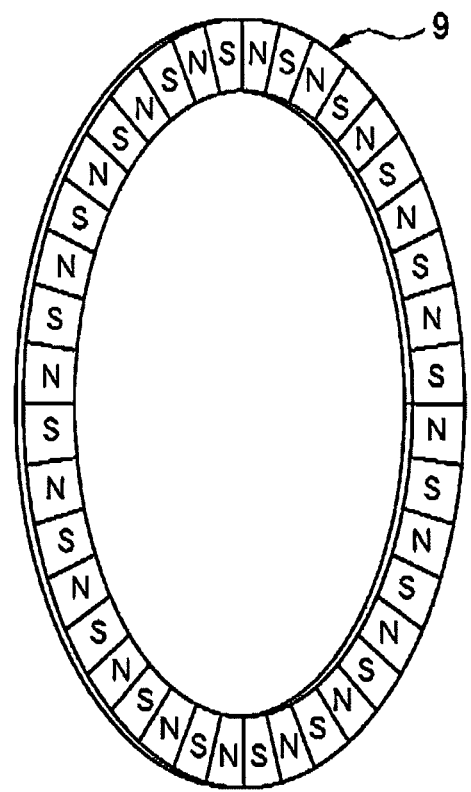
FIG. 23 is a perspective view illustrating an example of the magnetization pattern of the magnetic encoder that is provided in the ball bearing with magnetic encoder illustrated in FIG. 22.

FIG. 21 to FIG. 23 are drawings illustrating yet another example of a wheel support structure for a motorcycle that is capable of detecting the rotational speed of a wheel to which the first aspect of the present invention is applied. In a tenth embodiment illustrated in FIG. 21 and FIG. 22, the ball bearing 71 with magnetic encoder comprises a slinger 72 with magnetic encoder that is installed on the other end section on the rolling bearing side in that axial direction of the outer ring 22b on the opposite side from the end section in which the seal plate 28 is installed, and this slinger 72 comes very close to the inner ring 24, forming a labyrinth gap 42.

The slinger 72 with magnetic encoder comprises a slinger 73 with an L-shaped cross section having an outer diameter side perimeter edge section 74 that fits into a pressure fitting stepped section 41a that is formed in the inner circumferential surface of the end section in the axial direction of the outer ring 22, and a flat ring shaped plate section 75 faces in a direction normal to the axis; and a magnetic encoder 9 that is mounted and fastened to the ring shaped section 75. As illustrated in FIG. 23, the magnetic encoder 9 is a ring shaped member that has alternating N-poles and S-poles arranged continuously around the circumferential direction thereof, and is installed on the surface of the ring shaped plate section 75 of the slinger 73 on the opposite side from the ball 26 so that the detected surface faces in the axial direction. The magnetic sensor 17a is installed and fastened is the same way as in the first through ninth embodiments, however, the detecting surface of the magnetic sensor 17a faces in the horizontal direction according to the orientation of the detected surface of the magnetic encoder 9.

As explained above, with the construction of this first aspect of the present invention, by providing the magnetic encoder on the inside surrounded by a pair of bearings and the hub instead of on the fork side where the dimension in the axial direction is limited, it is possible to take advantage of the extra space between both bearings, and thus it is possible to increase the surface area per magnetic pole of the detected surface of the magnetic encoder, and to improve the precision of rotational speed detection of the wheel by the rotational speed detection apparatus for a motorcycle without sacrificing the ease of assembly of the wheel support structure for a motorcycle.

Moreover, in embodiments of placing the magnetic encoder around the inner circumferential surface of a cylindrical section that extends in the axial direction, the detected surface of the magnetic encoder can be provided around the inner circumferential surface of a cylinder that extends in the axial direction instead of a surface perpendicular to the axis of rotation having limited dimension, so with this construction it is possible to increase the axial length of the detected surface of the magnetic encoder, and thus further increase the surface area per magnetic pole.

On the other hand, in embodiments where instead of a seal plate and seal lips, a slinger or encoder installation plate having simple construction is installed, it is possible to reduce costs by simplifying processing. Moreover, by forming a labyrinth seal by having the end surface on the inner diameter side of the a circular disk section (sealed section) of the slinger or encoder installation plate closely face the outer circumferential surface of the inner ring, it is possible to suppress as need the flow of lubricant from inside the bearing. Furthermore, with this construction, by forming a non-contact seal, such as a labyrinth seal, in the space on the inside of the pair of bearings and hub, it is possible to reduce resistance to rotation.

[Second Aspect]

Figure 24:
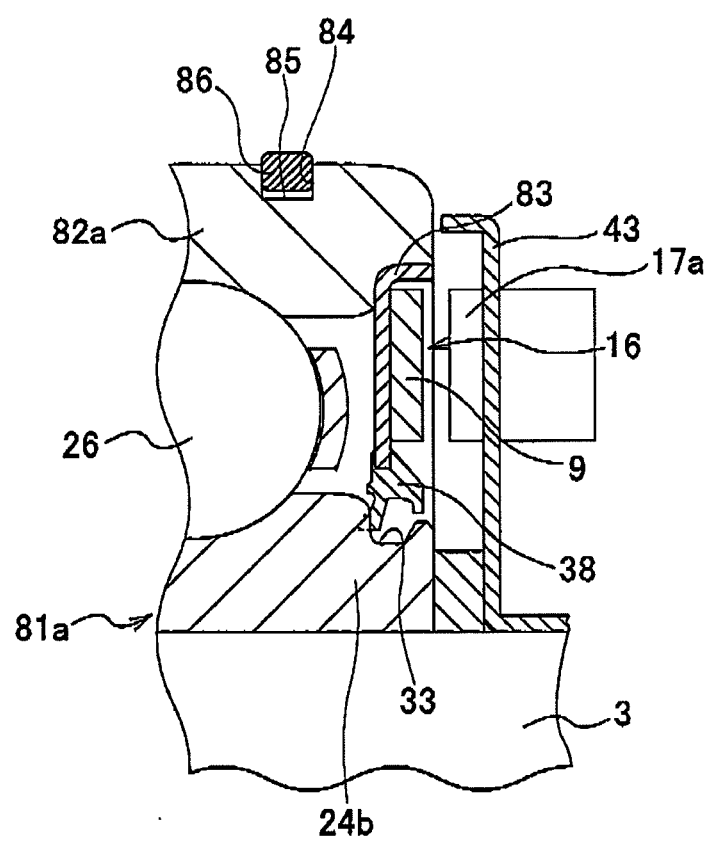
FIG. 24 is a cross-sectional view illustrating a first embodiment of a ball bearing with magnetic encoder that can be used in the wheel support structure for a motorcycle of second aspect of the present invention.
Figure 25:
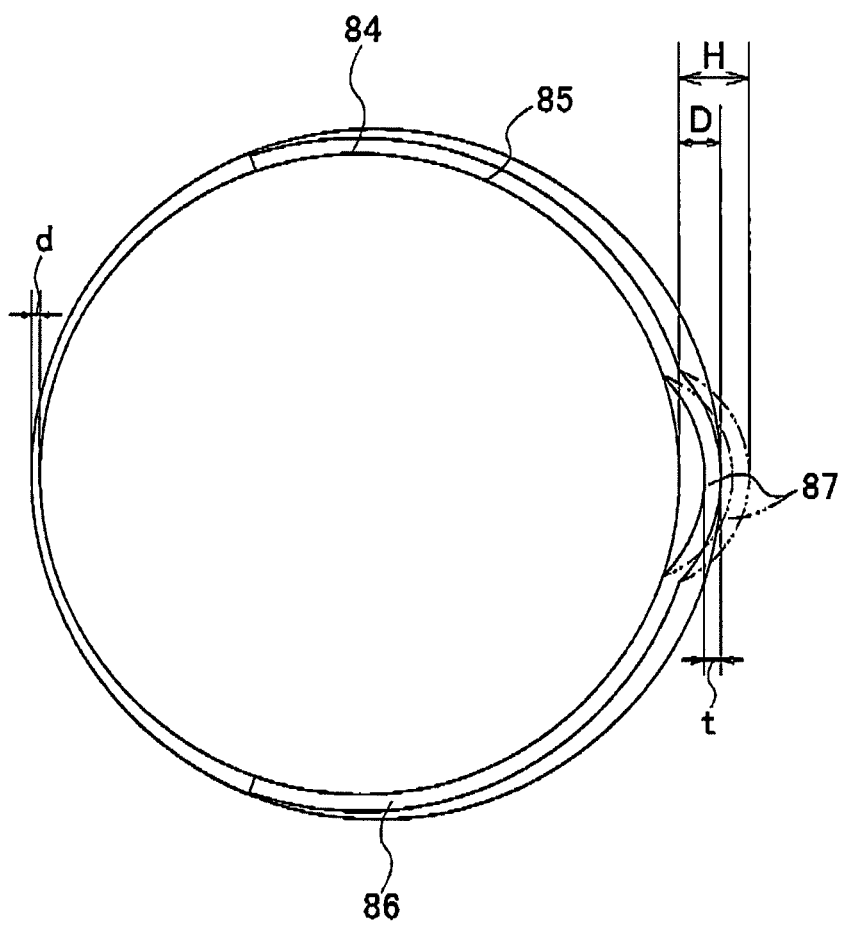
FIG. 25 is a schematic drawing of a first embodiment of the second aspect of the present invention, and illustrates the relationship between an eccentric groove that is formed around the outer circumferential surface of the outer ring, and a retaining ring that is fitted inside that eccentric groove.

FIG. 24 and FIG. 25 illustrate a first embodiment of the second aspect of the present invention. An eccentric groove 84 is formed around the outer circumferential surface of the outer ring 82a, which is the rotating ring. This bottom surface 85 of the eccentric groove 84 is eccentric with respect to the center of the outer circumferential surface of the outer ring 82a, and the depth gradually changes in the circumferential direction. A retaining ring 86 is mounted inside this eccentric groove 84. This retaining ring 86 is obtained by bending a wire raw material having a rectangular cross section such as stainless spring steel, and is C shaped that is little larger than a semicircle, or in other words, having a center angle that is a little greater than 180 degrees. This wire material has a thickness t in the radial direction that is greater than the depth d at the shallowest portion of the eccentric groove 84, and less than the depth D at the deepest portion (d<t<D). Moreover, the center section in the circumferential direction of the retaining ring 86 is bent such that the radius of curvature of that portion is greater than the other portions, and an elastic convex section 87 that protrudes outward in the radial direction is formed in that portion. The height H of the peak of this elastic convex section 87 in the free state, which is illustrated by the dot-dash line in FIG. 25, is greater than the depth D of the deepest portion of the eccentric groove 84 (H>D).

When fitting and fastening the outer ring 82a inside the hub 6, first the retaining ring 86 is mounted in the eccentric groove 84, and the elastic convex section 87 is positioned at the deepest portion of the eccentric groove 84. Then as illustrated by the solid line in FIG. 25, while pressing the elastic convex section 87 inward in the radial direction such that the peak of this elastic convex section 87 does not protrude outward in the radial direction from the outer circumferential surface of the outer ring 82a, the outer ring 82a is fitted inside the hub 6 with an interference fit. In the fitted state, the peak of this elastic convex section 87 comes in elastic contact with the inner circumferential surface of the hub 6. In this state, this elastic convex section 47 applies a pressing force against the inner circumferential surface of the hub 6 and the bottom surface 85 of the eccentric groove 84, and a large friction force due to the pressing force prevents the outer ring 82a from rotating with respect to the hub 6. Furthermore, when there is a tendency for this outer ring 82a to rotate with respect to the hub 6 against this pressing force, the end section in the circumferential direction of the retaining ring 86 displaces to the shallowest portion of the eccentric groove 84 and wedges in between the bottom surface 85 of the eccentric groove 84 and the inner circumferential shape of the hub 6. As a result, an extremely large friction force acts at the area of contact between the bottom surface 85 and the inner circumferential surface of the hub 6 and both the inner and outer circumferential surfaces of the end section in the circumferential direction of the retaining ring 86, and absolutely prevents the outer ring 82a from rotating with respect to the hub 6.

In the example in the figure, the thickness in the radial direction of the retaining ring 86 is constant around the circumferential direction. However, it is also possible to use an eccentric ring such as disclosed in JP10-82428 wherein the center axis of the outer circumferential surface and the center axis of the inner circumferential surface are eccentric, and the thickness in the radial direction is the greatest in the center section in the circumferential direction, and becomes small going toward both end sections in the circumferential direction. The amount of eccentricity of this kind of eccentric ring can be made to nearly coincide with the amount of eccentricity of the outer circumferential surface of the outer ring 82a and the bottom surface 85 of the eccentric groove 84, or to be a little less. By using an eccentric ring, the wedge action when there is a tendency for the outer ring 82a to rotate with respect to the hub 6 is large, and the effect of preventing relative rotation (creep) between the outer ring 82a and the hub 6 becomes even larger.

Figure 26:
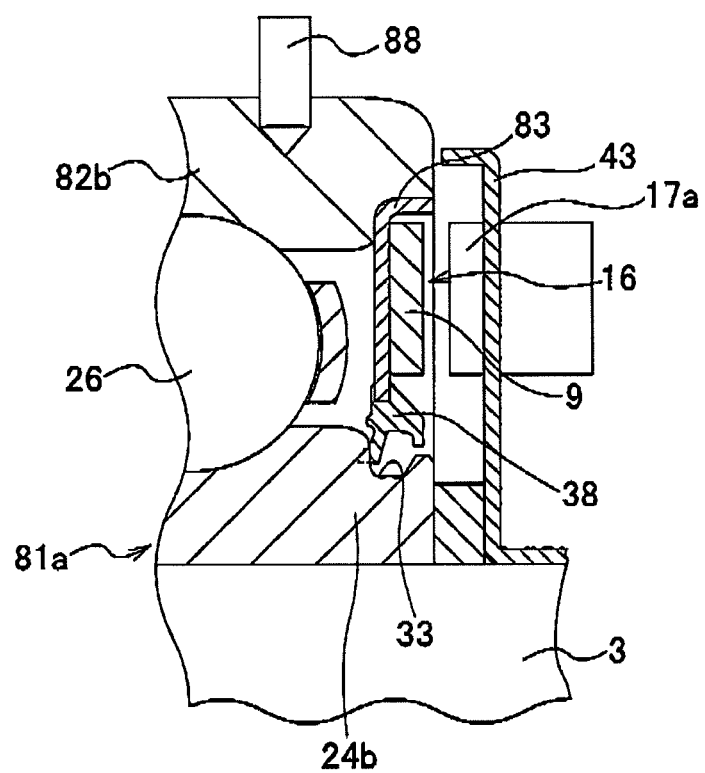
FIG. 26 is a cross-sectional view illustrating a second embodiment of a ball bearing with magnetic encoder that can be used in the wheel support structure for a motorcycle of second aspect of the present invention.
Figure 27:
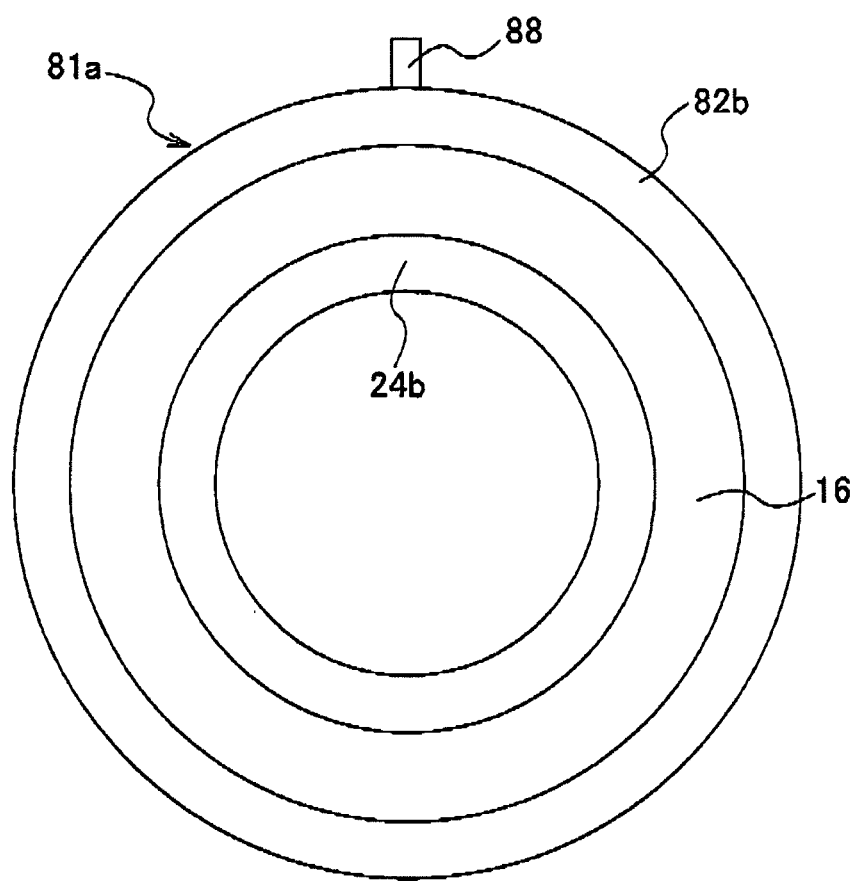
FIG. 27 is an end view of a ball bearing that supports a fastening pin at a location on the outer circumference of the outer ring in a second embodiment of the second aspect of the present invention.

FIG. 26 and FIG. 27 illustrate a second embodiment of the second aspect of the present invention. In this embodiment, a fastening pin 88 is supported on the outer circumferential surface of the outer ring 82b such that the pin protrudes outward in the radial direction from this outer circumferential surface. In order for this, a spring pin is pressure fitted into a concave hole that is formed in part of the circumferential surface of the outer ring 82b. On the other hand, in order for this outer ring 82b to fit inside the hub 6, a fastening groove (not illustrated in the figure) is formed in the axial direction around the inner circumferential surface of the hub 6 such that the fastening groove is open toward the end surface in the axial direction of the hub 6. As the outer ring 82b is fitted inside the hub 6 with an interference fit, the fastening pin 88 engages with the fastening groove. As a result, the outer ring 82b is prevented from rotating with respect to the hub 6.

Figure 28:
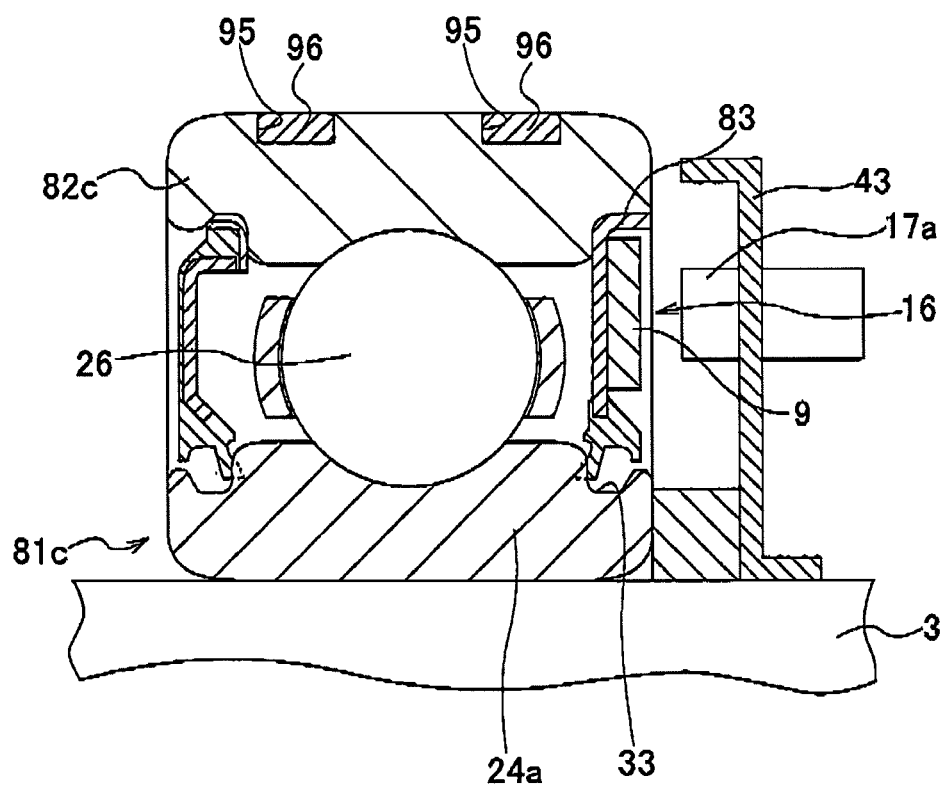
FIG. 28 is a cross-sectional view illustrating a third embodiment of a ball bearing with magnetic encoder that can be used in the wheel support structure for a motorcycle of second aspect of the present invention.

FIG. 28 illustrates a third embodiment of a second aspect of the present invention. In this embodiment, fastening grooves 95 are formed at two locations in the axial direction of the outer circumferential surface of the outer ring 82c, and friction rings 96 that are each made of synthetic resin are mounted in both of these fastening grooves 95. Both of these friction rings 96 have a rectangular cross-sectional shape and are formed into a ring shape around the entire circumference, having a break at one location in the circumferential direction so that the friction rings 96 can be mounted in both of the fastening grooves 95. With both of these friction rings 96 mounted in both of the fastening grooves 95, the outer circumferential surfaces of these friction rings 96 and the outer circumferential surface of the outer ring 82c are located on a single cylindrical surface, or the surfaces of the rings 96 protrude outward a little more than the outer circumferential surface of the outer ring 82c.

The linear expansion coefficients of both of the friction rings 96, which are each made of synthetic resin are greater than the linear expansion coefficient of the ferrous alloy or aluminum of the hub 6 in which the outer ring 82c fits. Therefore, as the temperature rises, both of the friction rings 96 thermally expand more than the outer ring 82c and the hub 6, and both the inner and outer circumferential surfaces of both of the friction rings 96 are strongly pressed by the bottom surfaces of both fastening grooves 95 and the inner circumferential surface of the hub 6. As a result, a large friction force acts between these surfaces, and the outer ring 82c is prevented from rotating relative to the hub 6. In addition to the method of mounting the friction rings 96 in the fastening grooves 95 as described above in which incomplete ring shaped friction rings 96 are fitted and fastened inside the fastening grooves 95, the friction rings 96 can also be formed by injection molding. When performing injection molding, the outer ring 82c is placed into the cavity of a formation die, and the friction rings 96 are formed by injection molding.

Figure 29:
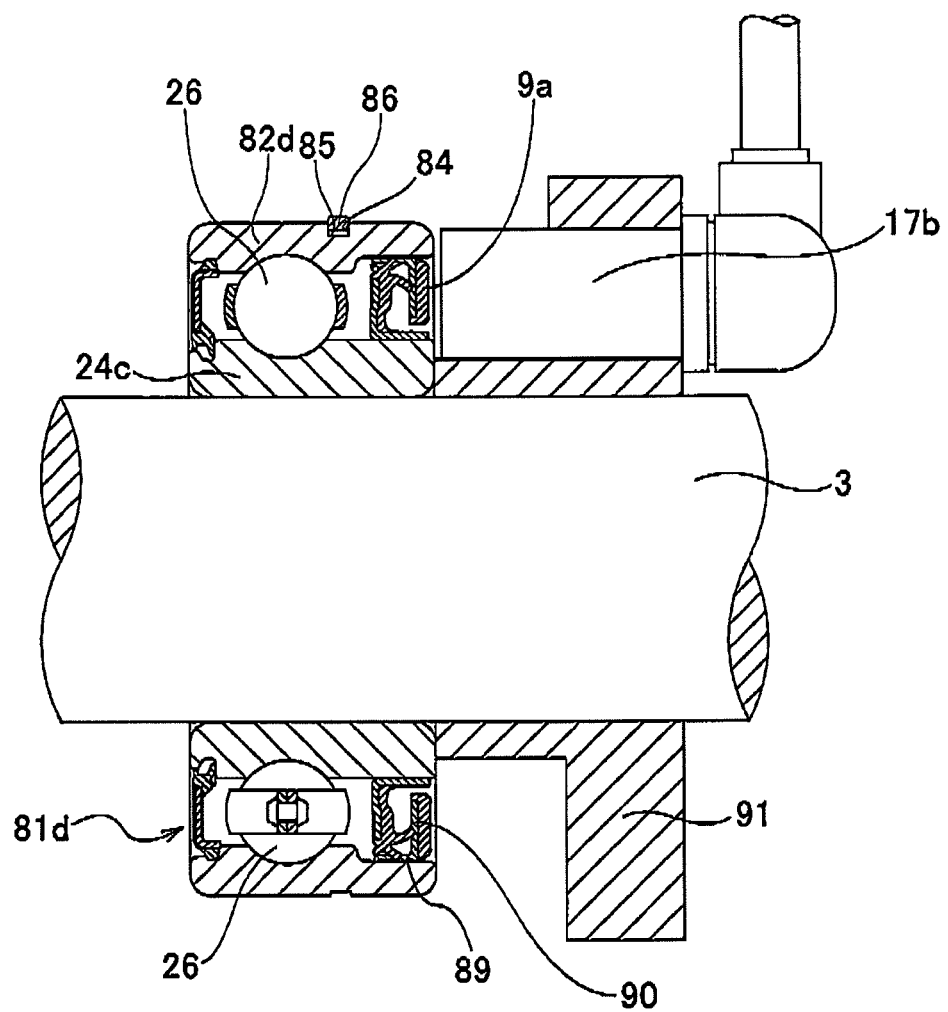
FIG. 29 is a cross-sectional view illustrating a variation of the first embodiment of a ball bearing with magnetic encoder that can be used in the wheel support structure for a motorcycle of second aspect of the present invention.

FIG. 29 illustrates a variation of the first embodiment of the second aspect of the present invention. In this variation, the ball bearing 81d with encoder is such that the encoder 9a that rotates together with the outer ring 82d is mounted to and supported by the outside surface of the slinger 90 of the combined seal ring 89. Moreover, a sensor holder 91 fits around the portion in the middle section of the support shaft 3 that is adjacent to the inner ring 24c, and the detecting section of the rotation detection sensor 17b that is supported by this sensor holder 91 faces the outside surface in the axial direction of the encoder 9a.

Figure 30:
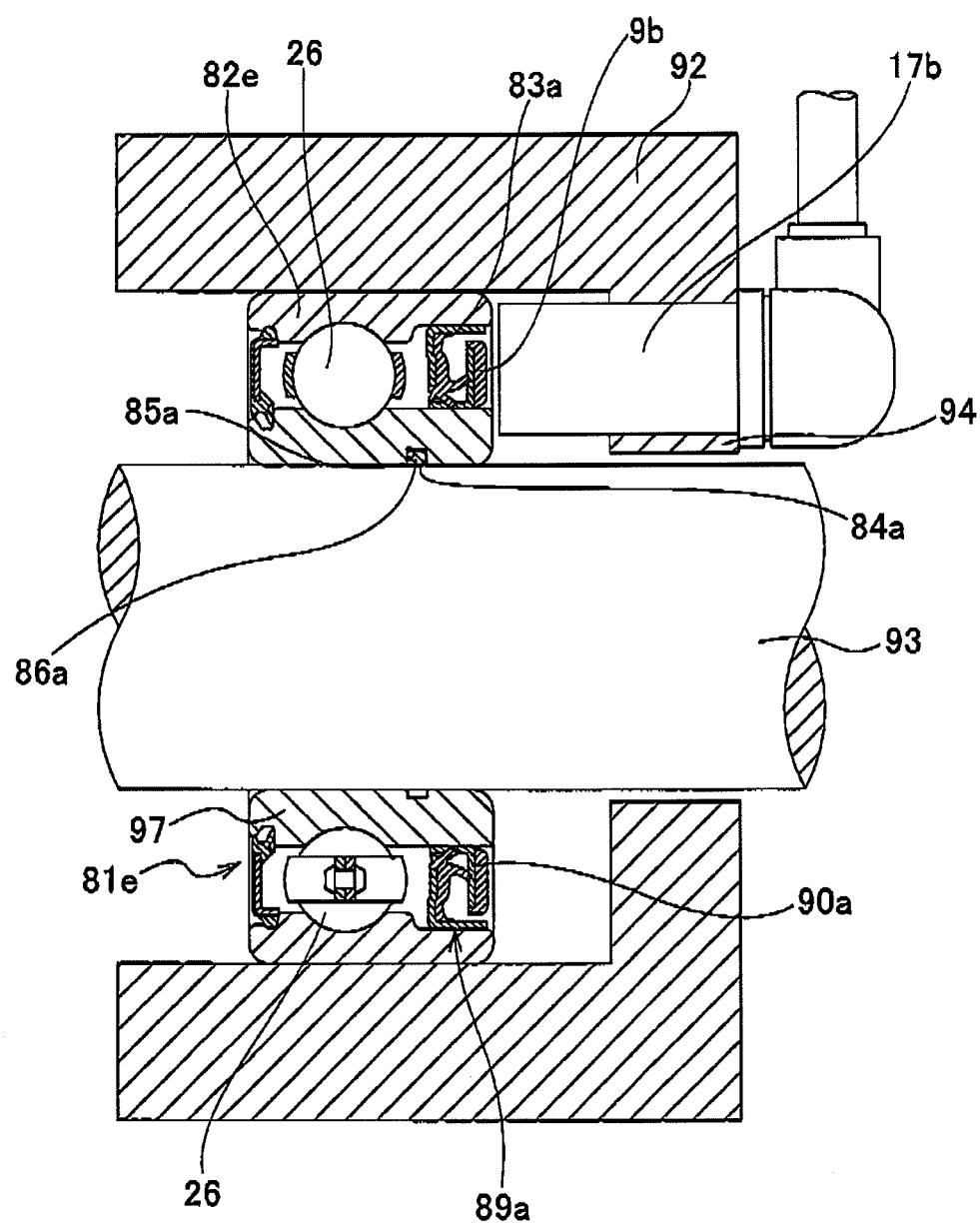
FIG. 30 is a cross-sectional view illustrating another variation of the first embodiment of a ball bearing with magnetic encoder that can be used in the wheel support structure for a motorcycle of second aspect of the present invention.

FIG. 30 illustrates another variation of the first embodiment of the second aspect of the present invention. In this variation, the case of applying the present invention to the construction of a rotating inner ring type ball bearing in which a rotating shaft 93, which is the center axis member, is supported on the inner diameter side of a bearing housing 92 is described. The construction of the ball bearing 81e with encoder itself is that same as in the variation of the first embodiment of the second aspect of the invention. In order to achieve the construction of a rotating inner ring type of bearing using a ball bearing 81e having the same construction, in this variation, the slinger 90a of the combined seal ring 89a is fitted and fastened around the outer circumferential surface of the inner ring 97 with an interference fit. Moreover, the metal core 83a of the seal ring 89a is fitted and fastened around the inner circumferential surface of the end section of the outer ring 82e. The ball bearing 81e with encoder is such that the encoder 9b is mounted to and supported by the entire outside surface of the slinger 90a. The magnetic sensor 17b is supported by a support flange 94 that is formed in the bearing housing 92. Furthermore, rotation restraining construction is provided between the inner circumferential surface of the inner ring 97 and the outer circumferential surface of the rotating shaft 93.

Figure 31:
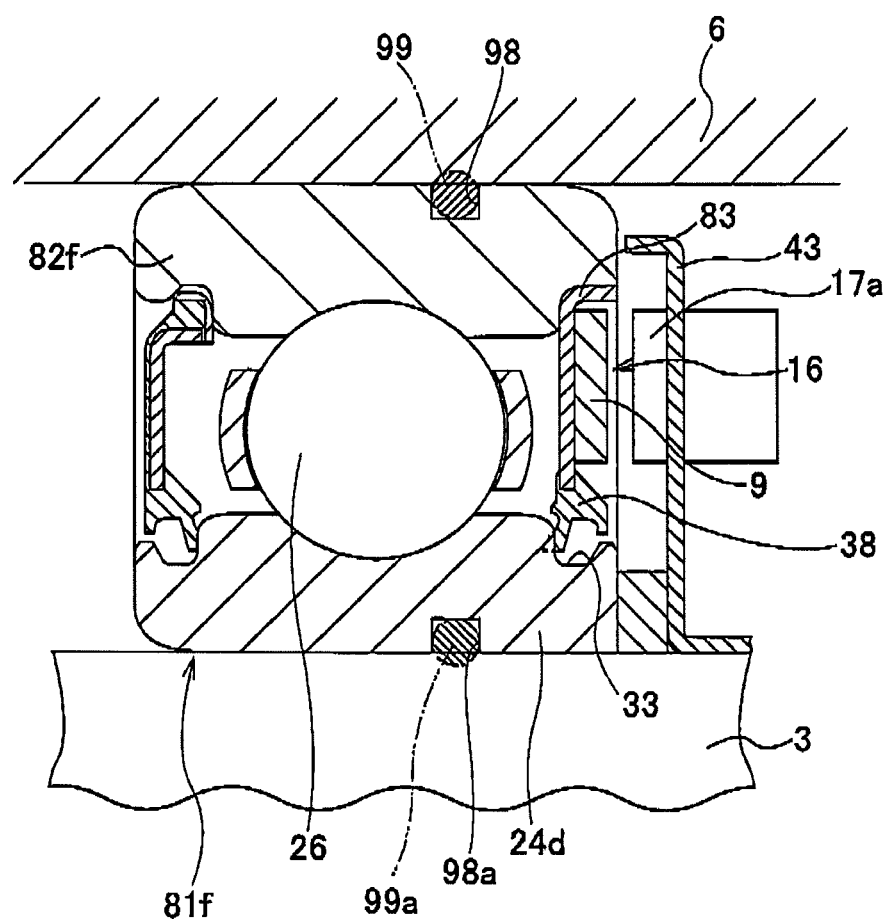
FIG. 31 is a cross-sectional view illustrating a fourth embodiment of a ball bearing with magnetic encoder that can be used in the wheel support structure for a motorcycle of second aspect of the present invention.

FIG. 31 illustrates a first example of a fourth embodiment of the second aspect of the present invention. A fastening groove 98 is formed all the way around the outer circumferential surface of the outer ring 82f, which is a rotating ring. An O-ring 99 is mounted in this fastening concave groove 98. This O-ring 99 is such that the cross-sectional diameter in the free state illustrated in FIG. 31 is larger than the depth of the fastening concave groove 98. Therefore, with the outer ring 82f in the state before being fitted inside the hub 6, the end section on the outer diameter side of the O-ring 99 protrudes further outward in the radial direction than the outer circumferential surface of the outer ring 82f. Therefore, when the outer ring 82f is fitted inside the hub 6 with an interference fit, the O-ring 99 is elastically pressed between the bottom surface of the fastening concave groove 98 and the inner circumferential surface of the hub 6. In this state, a large friction force acts between this bottom surface and inner circumferential surface and both the inner and outer circumferential surfaces of the O-ring 99. Consequently, even when the interference of the interference fit between the hub 6 and the outer ring 82f decreases or disappears, the outer ring 82f on which the encoder 9 is mounted does not rotate (creep) relative to the hub 6 that rotates together with the wheel. As a result, the rotational speed of the wheel and the encoder 9 perfectly coincide, and the reliability of detecting the rotational speed of the wheels of a two-wheeled vehicle can be improved.

Furthermore, in this embodiment, a fastening concave groove 98a is also formed in the inner circumferential surface of the inner ring 24d, and an O-ring 99a is also mounted inside that fastening concave groove 98a. When the inner ring 24d is fitted around and fastened to the support shaft 3 with an interference fit, this O-ring 99a is elastically pressed between the outer circumferential surface of the support shaft 3 and the bottom surface of the fastening groove 98a.

In the construction of this embodiment, the O-ring 99 prevents the outer ring 82f and the encoder 9 that is fastened to and supported by the outer ring 82f from rotating relative to the hub 6, and both of the O-rings 99, 99a maintain a seal between the inner circumferential surface of the hub 6 and the outer circumferential surface of the outer ring 82f, and the inner circumferential surface of the inner ring 24d and the outer circumferential surface of the support shaft 3.

Figure 32:
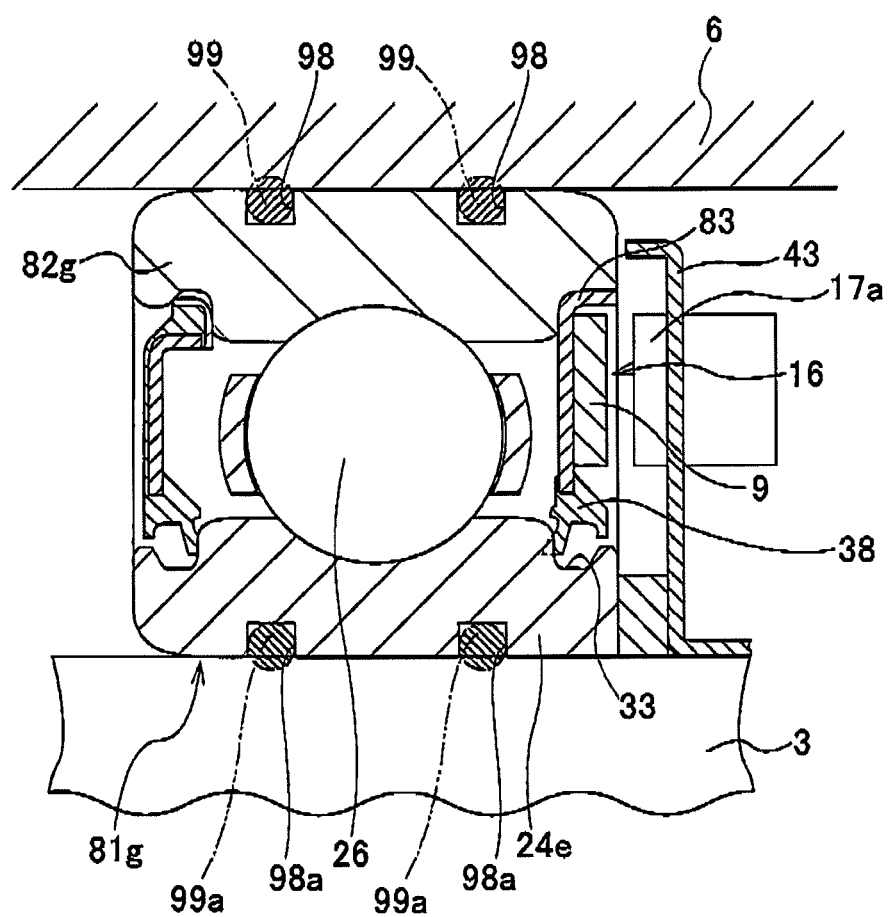
FIG. 32 is a cross-sectional view illustrating another example of the fourth embodiment of a ball bearing with magnetic encoder that can be used in the wheel support structure for a motorcycle of second aspect of the present invention.

FIG. 32 illustrates a second example of the fourth embodiment of the second aspect of the present invention. In this example, two fastening concave grooves 98 are formed around the outer circumferential surface of the outer ring 82g, two fastening concave grooves 98a are formed around the inner circumferential surface of the inner ring 24e, and O-rings 99, 99a are respectively mounted in these fastening grooves 98, 98a. With the construction of this example, when compared with the first example described above, the effect of preventing creep by the outer ring 82g with respect to the hub 6 is improved, and the seal between the inner circumferential surface of the hub 6 and the outer circumferential surface of the outer ring 82g, and the seal between the inner circumferential surface of the inner ring 24e and the outer circumferential surface of the support shaft 3 can be maintained more sufficiently.

Figure 33:
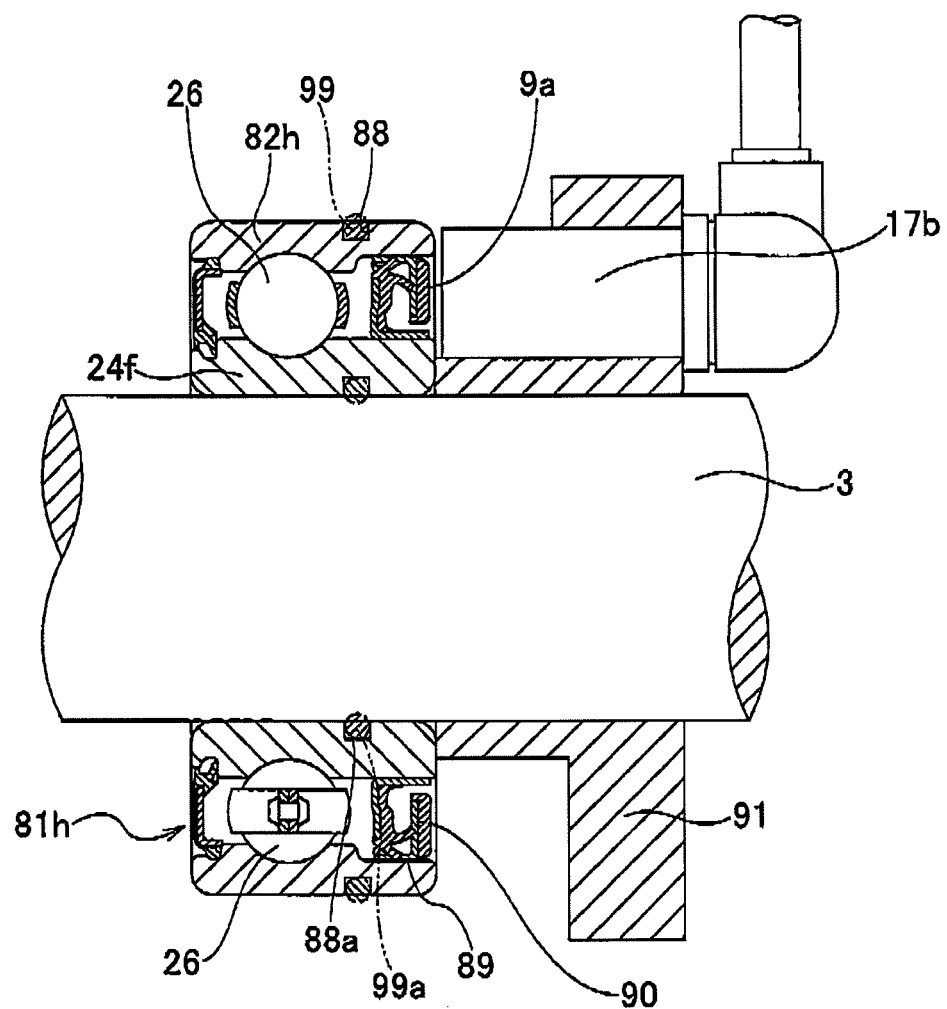
FIG. 33 is a cross-sectional view illustrating another example of the fourth embodiment of a ball bearing with magnetic encoder that can be used in the wheel support structure for a motorcycle of second aspect of the present invention.

FIG. 33 illustrates a third example of the fourth embodiment of the second aspect of the present invention. In this example, the ball bearing 81h with encoder is such that the encoder 9a that rotates together with the outer ring 82h is mounted to and supported by the outside surface of the slinger 90 of the combined seal ring 89. A sensor holder 91 is fitted and fastened around the portion in the middle of the support shaft 3 that is adjacent to the inner ring 24f of the ball bearing 81h, and the detecting section of the magnetic sensor 17b that is supported by this sensor holder 91 faces the outside surface in the axial direction of the encoder 9a.

Figure 34:
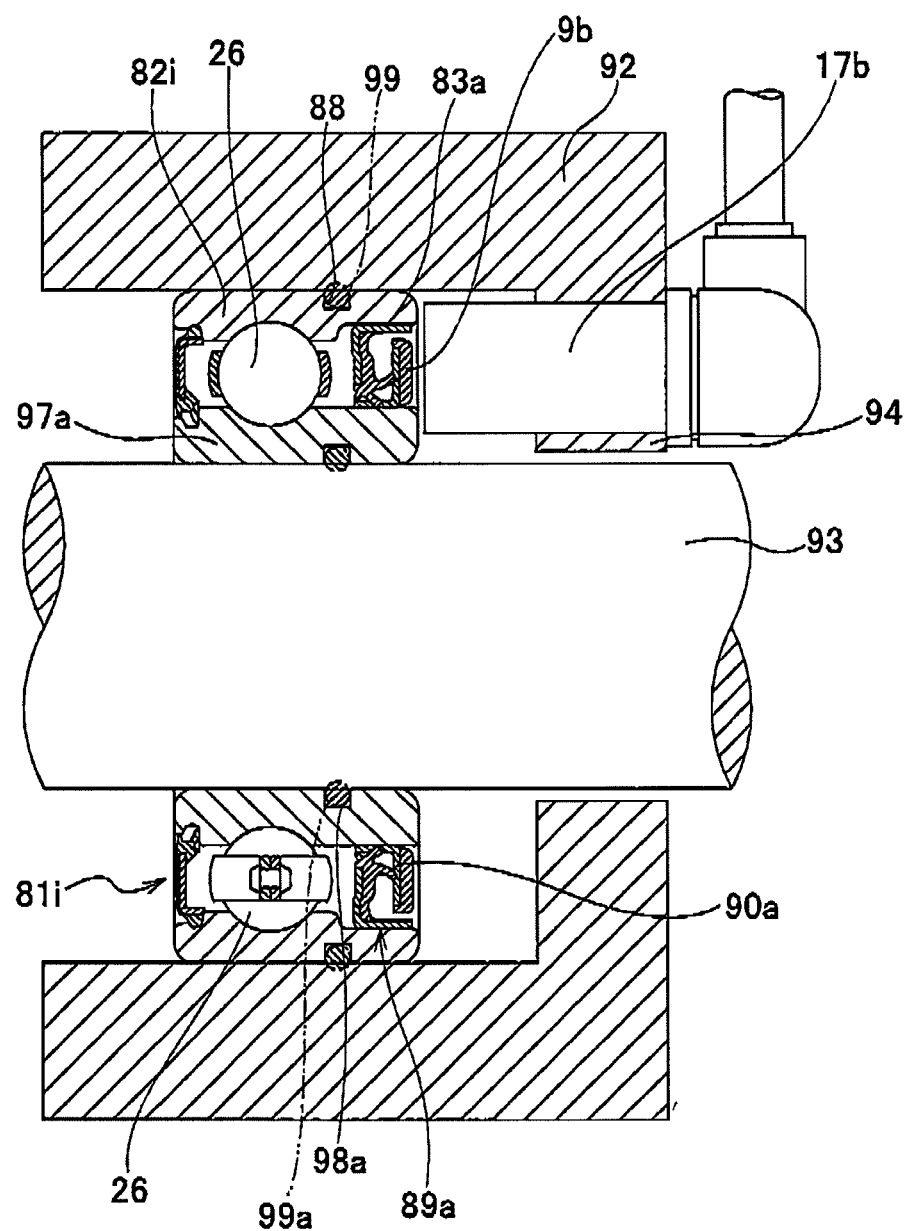
FIG. 34 is a cross-sectional view illustrating yet another example of the fourth embodiment of a ball bearing with magnetic encoder that can be used in the wheel support structure for a motorcycle of second aspect of the present invention.

FIG. 34 illustrates a fourth example of the fourth embodiment of the second aspect of the present invention. In this variation, the case of applying the present invention to the construction of a rotating inner ring type ball bearing in which a rotating shaft 93, which is the center axis member, is supported on the inner diameter side of a bearing housing 92 is described. The construction of the ball bearing 81i with encoder itself is that same as in the third example. In order to achieve the construction of a rotating inner ring type of bearing using a ball bearing 81i having the same construction, in this variation, the slinger 90a of the combined seal ring 89a is fitted and fastened around the outer circumferential surface of the inner ring 97a with an interference fit. Moreover, the metal core 83a of the seal ring 89a is fitted and fastened around the inner circumferential surface of the end section of the outer ring 82i. The encoder 9b is mounted to and supported by the entire outside surface of the slinger 90a. The magnetic sensor 17b is supported by a support flange 94 that is formed in the bearing housing 92. Furthermore, rotation restraining construction is provided between the inner circumferential surface of the inner ring 97a and the outer circumferential surface of the rotating shaft 93.

In this second aspect of the present invention, a rotation restraining member is fastened to the circumferential surface of the engaging side of the rotating ring, and by engaging with the circumferential surface of the rotating member, this rotation restraining member is able to prevent relative rotation (creep) of the rotating ring on which the encoder is mounted and the opposing member that fits with and supports the rotating ring, and thus it is possible to improve the reliability of the rotational speed detection of a wheel of a motorcycle. Moreover, this rotation restraining member is able to improve the seal between the rolling bearing for a wheel of a motorcycle and the supporting shaft.

INDUSTRIAL APPLICABILITY

The present invention is preferably applied to a wheel support structure for a motorcycle (two-wheeled motor vehicle) that is more compact than a wheel support structure for a four-wheeled motor vehicle, and is mainstream rotating outer ring type. Each of the embodiments of the present invention can be mutually applied together as long as they compatible.

EXPLANATION OF REFERENCE NUMBERS 1, 1a Wheel support structure for a motorcycle
2 Fork
3 Support shaft
4, 4a Single-row ball bearing
5a, 5b, 5c Inner ring spacer
6 Hub
7 Wheel
8 Nut
9, 9a, 9b Magnetic encoder
10 Ball bearing with magnetic encoder
11 Outer ring
12 Inner ring
13 Ball
14 Retainer
15 Seal plate
16 Seal plate with magnetic encoder
17, 17a, 17b Magnetic sensor
18 Magnetic sensor holder member
19 Magnetic sensor harness
20 Wheel support structure for a motorcycle
21a, 21b, 21c, 21d, 21e, 21f, 21g Ball bearing with magnetic encoder
22, 22a, 22b Outer ring
23 Seal fastening groove
24, 24a, 24b, 24c, 24d, 24e, 24f Inner ring
25 Seal groove
26 Ball
27 Retainer
28 Seal plate
29 Metal core
30 Elastic member
31 Seal lips
32, 32A, 32B Inner surface of the outer ring
33 Seal groove
34, 34a Magnetic encoder
35a, 35b, 35c, 35d, 35e, 35f, 35g Encoder installation plate
36a, 36b, 36c, 36d, 36e, 36f, 36g Cylindrical section
37a, 37b, 37c, 37d Sealed circular disk section
38 Seal lips
39 Bent section
40 Slinger
41, 41a Pressure fitting stepped section
42 Labyrinth gap
43 Holder member for a magnetic sensor
50 Wheel support structure for a motorcycle
51a, 51b, 51c, 51d, 51e Ball bearing with magnetic encoder
55a, 55b, 55c, 55d, 55e Encoder installation plate
56a, 56b, 56c, 56d, 56e Cylindrical section
57a, 57b Sealed section
60 Wheel support structure of a motorcycle
61a, 61b, 61c Ball bearing with magnetic encoder
65a, 65b, 65c Encoder installation plate
66a, 66b, 66c Cylindrical section
67a, 67b, 67c Sealed section
68 Circular disk section
69a, 69b Pressure fitting section
70 Wheel support structure for a motorcycle
71 Ball bearing with magnetic encoder
72 Slinger with magnetic encoder
73 Slinger
74 Outer diameter side perimeter edge section
75 Ring shape plate section
81a, 81b, 81c, 81d, 81e, 81f, 81g, 81h, 81i Ball bearing with magnetic encoder
82a, 82b, 82c, 82d, 82f, 82g, 82h, 82i Outer ring 83, 83a Metal core
84, 84a Eccentric groove
85, 85a Bottom surface
86, 86a Retaining ring
87 Elastic convex section
88 Fastening pin
89, 89a Combined seal ring
90, 90a Slinger
91 Sensor holder
92 Bearing housing
93 Rotating shaft
94 Support flange
95 Fastening groove
96 Friction ring
97, 97a Inner ring
98, 98a Fastening groove
99, 99a O-ring

What is claimed is:

1. A wheel support structure for a motorcycle, the wheel support structure comprising:
a pair of rolling bearings, each having an outer ring as a rotating ring, an inner ring as a stationary ring, and a plurality of balls that are located in the circumferential direction between the outer ring and inner ring such that the balls can roll freely;
a support shaft, both ends thereof being connected to the motorcycle by way of forks;
a hub that supports a tire by way of a wheel such that the tire can rotate;
a magnetic encoder that is installed in one of the pair of rolling bearings and that has a detected surface; and
a magnetic sensor that is fastened to the support shaft or to a non-rotating member that is provided on the support shaft, and that has a detecting surface that faces the detected surface of the magnetic encoder,
the magnetic encoder being mounted and fastened to an inner circumferential surface of a cylindrical section, which extends outward in the axial direction from the outer ring, of an encoder installation plate that is attached to an end section in the axial direction of the outer ring of one of the rolling bearings on a first side adjacent to another rolling bearing, or being mounted and fastened to a side surface of a slinger on the first side, which is attached to the end section in the axial direction of the outer ring of the one rolling bearing on the first side such that an end surface on an inner diameter side faces the outer surface of the inner ring to form labyrinth space;
wherein the encoder installation plate, the end section in the axial direction of the cylindrical section thereof being pressure fitted into the inner circumferential surface of the outer ring, further comprises: a bent section that is bent toward the inside in the radial direction from the outer end in the axial direction of the cylindrical section.

2. The wheel support structure for a motorcycle according to claim 1, wherein a pressure fitting stepped section is formed around the inner circumferential surface of the end section of the outer ring on the first side to have a larger diameter than the inner circumferential surface; and the encoder installation plate is pressure fitted into the pressure fitting stepped section.

3. The wheel support structure for a motorcycle according to claim 2, wherein the encoder installation plate further comprises a bent section that is bent from the inside end in the axial direction of the cylindrical section, and comes in contact with the side surface of a pressure fitting section.

4. A wheel support structure for a motorcycle, the wheel support structure comprising:
a pair of rolling bearings, each having an outer ring as a rotating ring, an inner ring as a stationary ring, and a plurality of balls that are located in the circumferential direction between the outer ring and inner ring such that the balls can roll freely;
a support shaft, both ends thereof being connected to the motorcycle by way of forks;
a hub that supports a tire by way of a wheel such that the tire can rotate;
a magnetic encoder that is installed in one of the pair of rolling bearings and that has a detected surface; and
a magnetic sensor that is fastened to the support shaft or to a non-rotating member that is provided on the support shaft that has a detecting surface that faces the detected surface of the magnetic encoder,
the magnetic encoder being mounted and fastened to an inner circumferential surface of a cylindrical section, which extends outward in the axial direction from the outer ring, of an encoder installation plate that is attached to an end section in the axial direction of the outer ring of one of the rolling bearings on a first side adjacent to another rolling bearing, or being mounted and fastened to a side surface of a slinger on the first side, which is attached to the end section in the axial direction of the outer ring of the one rolling bearing on the first side such that an end surface on an inner diameter side faces the outer surface of the inner ring to form labyrinth space;
wherein the encoder installation plate, the end section in the axial direction of the cylindrical section thereof being pressure fitted into the inner circumferential surface of the outer ring, further comprises: a bent section that is bent toward the inside in the radial direction from the outer end in the axial direction of the cylindrical section; and a circular disk section that is bent toward the inside in the radial direction from the inside end in the axial direction of the cylindrical section such that the end surface on the inner diameter side of the circular disk section faces the outer circumferential surface of the inner ring.

5. The wheel support structure for a motorcycle according to claim 4, wherein a pressure fitting stepped section is formed around the inner circumferential surface of the end section of the outer ring on the first side to have a larger diameter than the inner circumferential surface; and the encoder installation plate is pressure fitted into the pressure fitting stepped section.

6. A wheel support structure for a motorcycle, the wheel support structure comprising:
a pair of rolling bearings, each having an outer ring as a rotating ring, an inner ring as a stationary ring, and a plurality of balls that are located in the circumferential direction between the outer ring and inner ring such that the balls can roll freely;
a support shaft, both ends thereof being connected to the motorcycle by way of forks;
a hub that supports a tire by way of a wheel such that the tire can rotate;
a magnetic encoder that is installed in one of the pair of rolling bearings and that has a detected surface; and
a magnetic sensor that is fastened to the support shaft or to a non-rotating member that is provided on the support shaft, and that has a detecting surface that faces the detected surface of surface the magnetic encoder, the magnetic encoder being mounted and fastened to an inner circumferential of cylindrical section, which extends outward in the axial direction from the outer ring, of an encoder installation plate that is attached to an end section in the axial direction of the outer ring of one of the rolling bearings on a first side adjacent to another rolling bearing, or being mounted and fastened to a side surface of a slinger on the first side, which is attached to the end section in the axial direction of the outer ring of the one rolling bearing on the first side such that an end surface on an inner diameter side faces the outer surface of the inner ring to form labyrinth space;

wherein the encoder installation plate, the end section in the axial direction of the cylindrical section thereof being pressure fitted into the inner circumferential surface of the outer ring, further comprises: a bent section that is bent toward the inside in the radial direction from the outer end in the axial direction of the cylindrical section; a circular disk section that is bent toward the inside in the radial direction from the inside end in the axial direction of the cylindrical section; and seal lips that are provided around the inner perimeter section of the circular disk section such that the seal lips come in sliding contact with the inner ring.

7. The wheel support structure for a motorcycle according to claim 6, wherein a pressure fitting stepped section is formed around the inner circumferential surface of the end section of the outer ring on the first side to have a larger diameter than the inner circumferential surface; and the encoder installation plate is pressure fitted into the pressure fitting stepped section.

8. A wheel support structure for a motorcycle, the wheel support structure comprising:
   a pair of rolling bearings, each having an outer ring as a rotating ring, an inner ring as a stationary ring, and a plurality of balls that are located in the circumferential direction between the outer ring and inner ring such that the balls can roll freely;
   a support shaft, both ends thereof being connected to the motorcycle by way of forks;
   a hub that supports a tire by way of a wheel such that the tire can rotate;
   a magnetic encoder that is installed in one of the pair of rolling bearings and that has a detected surface; and
   a magnetic sensor that is fastened to the support shaft or to a non-rotating member that is provided on the support shaft, and that has a detecting surface that faces the detected surface of the magnetic encoder,
   the magnetic encoder being mounted and fastened to an inner circumferential surface of a cylindrical section, which extends outward in the axial direction from the outer ring, of an encoder installation plate that is attached to an end section in the axial direction of the outer ring of one of the rolling bearings on a first side adjacent to another rolling bearing, or being mounted and fastened to a side surface of a slinger on the first side, which is attached to the end section in the axial direction of the outer ring of the one rolling bearing on the first side such that an end surface on an inner diameter side faces the outer surface of the inner ring to form labyrinth space;

wherein the cylindrical section has a diameter larger than the inner circumferential surface of the outer ring; and the encoder installation plate further comprises: a pressure fitting section that is pressure fitted with the inner circumferential surface of the outer ring; a circular disk section that connects the pressure fitting section with the cylindrical section; and a circular disk section that is bent toward the inside in the radial direction from the inside end in the axial direction of the pressure fitting section such that the end surface on the inner diameter side of a circular disk section faces the outer circumferential surface of the inner ring.

9. A wheel support structure for a motorcycle, the wheel support structure comprising:
   a pair of rolling bearings, each having an outer ring as a rotating ring, an inner ring as a stationary ring, and a plurality of balls that are located in the circumferential direction between the outer ring and inner ring such that the balls can roll freely;
   a support shaft, both ends thereof being connected to the motorcycle by way of forks;
   a hub that supports a tire by way of a wheel such that the tire can rotate;
   a magnetic encoder that is installed in one of the pair of rolling bearings and that has a detected surface; and
   a magnetic sensor that is fastened to the support shaft or to a non-rotating member that is provided on the support shaft, and that has a detecting surface that faces the detected surface of the magnetic encoder,
   the magnetic encoder being mounted and fastened to an inner circumferential surface of a cylindrical section, which extends outward in the axial direction from the outer ring, of an encoder installation plate that is attached to an end section in the axial direction of the outer ring of one of the rolling bearings on a first side adjacent to another rolling bearing, or being mounted and fastened to a side surface of a slinger on the first side, which is attached to the end section in the axial direction of the outer ring of the one rolling bearing on the first side such that an end surface on an inner diameter side faces the outer surface of the inner ring to form labyrinth space;

wherein the cylindrical section has a diameter larger than the inner circumferential surface of the outer ring; and the encoder installation plate further comprises: a pressure fitting section that is pressure fitted into the inner circumferential surface of the outer ring; a circular disk section that connects the pressure fitting section with the cylindrical section; a circular disk section that is bent toward the inside in the radial direction from the inside end in the axial direction of the pressure fitting section; and seal lips that are provided on the inner perimeter section of a circular disk section and having a sliding contact with the inner ring.

* * * * *